(12) United States Patent
Cyrén et al.

(10) Patent No.: US 12,203,545 B2
(45) Date of Patent: Jan. 21, 2025

(54) EXTERNAL ACTUATOR SYSTEM

(71) Applicant: KA Group AG, Zürich (CH)

(72) Inventors: Bengt Cyrén, Svanesund (SE); Jasmin Insanic, Jönköping (SE)

(73) Assignee: KA Group AG, Zürich (CH)

( * ) Notice: Subject to any disclaimer, the term of this patent is extended or adjusted under 35 U.S.C. 154(b) by 0 days.

(21) Appl. No.: 18/554,740

(22) PCT Filed: Oct. 21, 2021

(86) PCT No.: PCT/IB2021/059718
§ 371 (c)(1),
(2) Date: Oct. 10, 2023

(87) PCT Pub. No.: WO2022/219393
PCT Pub. Date: Oct. 20, 2022

(65) Prior Publication Data
US 2024/0209938 A1    Jun. 27, 2024

Related U.S. Application Data

(60) Provisional application No. 63/174,815, filed on Apr. 14, 2021.

(51) Int. Cl.
*F16H 63/30* (2006.01)
*F16D 23/12* (2006.01)
(Continued)

(52) U.S. Cl.
CPC ............ *F16H 63/32* (2013.01); *F16D 23/12* (2013.01); *F16H 63/304* (2013.01);
(Continued)

(58) Field of Classification Search
CPC .... F16H 61/0003; F16H 63/04; F16H 63/304; F16H 63/32; F16H 2063/3056;
(Continued)

(56) References Cited

U.S. PATENT DOCUMENTS

| 4,449,416 A | 5/1984 | Huitema |
| 4,745,822 A | 5/1988 | Trachman et al. |

(Continued)

FOREIGN PATENT DOCUMENTS

| BR | 8706692 A | * | 7/1988 | ......... F16H 63/3023 |
| CN | 104235330 A | * | 12/2014 | ........... F16H 57/028 |

(Continued)

OTHER PUBLICATIONS

Auto Tech Review, "Modular System For Electrical Drive Axles", vol. 4, Issue 2, Feb. 2015, 5 pages.

(Continued)

*Primary Examiner* — Adam D Rogers
(74) *Attorney, Agent, or Firm* — Howard & Howard Attorneys PLLC

(57) ABSTRACT

The present teachings provide for a system comprising a gearbox including a gear assembly, the gearbox having an outer surface, the outer surface with a pair of apertures; and an actuator. The actuator including a support with a pair of lugs, with each lug having an opening; an drive system connected to the support; a shift fork including a pair of arms, the shift fork in communication with the drive system and configured to move a distance defining a stroke length between a disengaged position and an engaged position; and an actuation assembly operatively connected with the drive system to move the shift fork between a neutral position, and a shifted position, with a plurality of intermediate positions between the neutral and shifted positions. The actuator is mounted onto the outer surface of the gearbox, with the pair of lugs extending into the pair of apertures of the gearbox, and at least a portion of the shift fork extends extending through the lugs into and below the outer surface of the gearbox. The portion of the shift fork within the gearbox engages a gear assembly within the gearbox.

20 Claims, 17 Drawing Sheets

(51) Int. Cl.
*F16H 63/32* (2006.01)
*F16D 23/14* (2006.01)

(52) U.S. Cl.
CPC .. *F16D 2023/123* (2013.01); *F16D 2023/141* (2013.01); *F16H 2063/325* (2013.01)

(58) Field of Classification Search
CPC ....... F16H 2063/3089; F16H 2063/328; F16D 23/12; F16D 2023/123; F16D 2023/141
See application file for complete search history.

(56) References Cited

U.S. PATENT DOCUMENTS

| | | | |
|---|---|---|---|
| 4,785,681 | A | 11/1988 | Kuratsu et al. |
| 5,408,898 | A | 4/1995 | Steeby et al. |
| 6,619,153 | B2 | 9/2003 | Smith et al. |
| 7,409,887 | B2 | 8/2008 | Riegler et al. |
| 7,694,598 | B2 | 4/2010 | Kriebernegg et al. |
| 7,841,253 | B2 * | 11/2010 | Uberti ................ F16H 61/30 74/335 |
| 9,611,917 | B2 | 4/2017 | Takahashi |
| 10,500,952 | B2 * | 12/2019 | Wentz ................ B60K 23/08 |
| 10,584,778 | B2 * | 3/2020 | Peterson ............. F16D 13/38 |
| 10,851,880 | B2 * | 12/2020 | Peterson ............. F16H 57/02 |
| 10,895,321 | B2 * | 1/2021 | Peterson ............ F16H 61/0021 |
| 11,105,412 | B2 * | 8/2021 | Chen ................ F16H 63/486 |
| 11,767,903 | B2 * | 9/2023 | Wei .................. F16H 25/20 74/89.23 |
| 2007/0175286 | A1 | 8/2007 | Oliveira et al. |
| 2009/0229392 | A1 | 9/2009 | Kim et al. |
| 2009/0277296 | A1 | 11/2009 | Englund et al. |
| 2019/0054816 | A1 | 2/2019 | Garcia et al. |
| 2019/0054817 | A1 | 2/2019 | Garcia et al. |
| 2019/0054818 | A1 | 2/2019 | Garcia et al. |

FOREIGN PATENT DOCUMENTS

| | | | |
|---|---|---|---|
| DE | 3706386 | A1 | 9/1988 |
| DE | 102014224366 | A1 | 6/2016 |
| EP | 0600620 | A1 | 6/1994 |
| EP | 0620388 | A1 | 10/1994 |
| EP | 0695892 | A2 | 2/1996 |
| EP | 0756113 | A1 | 1/1997 |
| EP | 1118803 | A2 | 7/2001 |
| EP | 809049 | B1 | 10/2001 |
| EP | 2116746 | A1 | 11/2009 |
| EP | 2886911 | A1 | 6/2015 |
| EP | 3219190 | B1 | 9/2019 |
| GB | 2153479 | A | 8/1985 |
| JP | S 63-38721 | | 2/1988 |
| JP | S6338721 | A | 2/1988 |
| JP | 084897 | A * | 1/1996 |
| JP | 5666860 | B2 | 2/2015 |
| KR | 20050120954 | A | 12/2005 |
| KR | 100566622 | B1 | 3/2006 |
| KR | 101496558 | B1 | 2/2015 |
| KR | 101610510 | B1 | 4/2016 |
| WO | 2018217546 | A1 | 11/2018 |
| WO | WO-2021168663 | A1 * | 9/2021 |

OTHER PUBLICATIONS

Computer-generated English language translation for KR 100566622 B1 extracted from espacenet.com database on Oct. 11, 2023, 7 pages.
Computer-generated English language translation for KR 20050120954 A extracted from espacenet.com database on Oct. 11, 2023, 5 pages.
Ebay, "Toyota Genuine Solenoid Vacuum Differential Actuator 4WD Front 41400-35034, " https://www.ebay.com/itm/285055070076, 1995-2023, 5 pages.
English language abstract for DE 37 06 386 A1 extracted from espacenet.com database on Oct. 11, 2023, 1 page.
English language abstract for EP 1 118 803 A2 extracted from espacenet.com database on Oct. 11, 2023, 1 page.
English language abstract for JP 5666860 B2 extracted from espacenet.com database on Oct. 11, 2023, 2 pages.
English language abstract for JPS 63-38721 A extracted from espacenet.com database on Oct. 11, 2023, 1 page.
English language abstract for KR 101496558 B1 extracted from espacenet.com database on Oct. 11, 2023, 1 page.
English language abstract for KR 101610510 B1 extracted from espacenet.com database on Oct. 11, 2023, 1 page.
International Search Report for Application No. PCT/IB2021/059718 dated Jan. 25, 2022, 3 pages.
International Search Report for Application No. PCT/IB2021/059736 dated Feb. 23, 2022, 3 pages.
Luk Group, "7th Luk Symposium—Chapter 15: Electro-Mechanical Actuators", Apr. 2002, 15 pages.
Machine-assisted English language abstract for DE 10 2014 224 366 A1 extracted from espacenet.com database on Oct. 11, 2023, 4 pages.
Schaeffler Group, "Press Releases Webpage", https://www.schaeffler.com/en/media/press-releases/?filter=language%3A167&page=1, 2020, 3 pages.
United States Non-Provisional U.S. Appl. No. 18/554,727, filed Oct. 10, 2023.

* cited by examiner

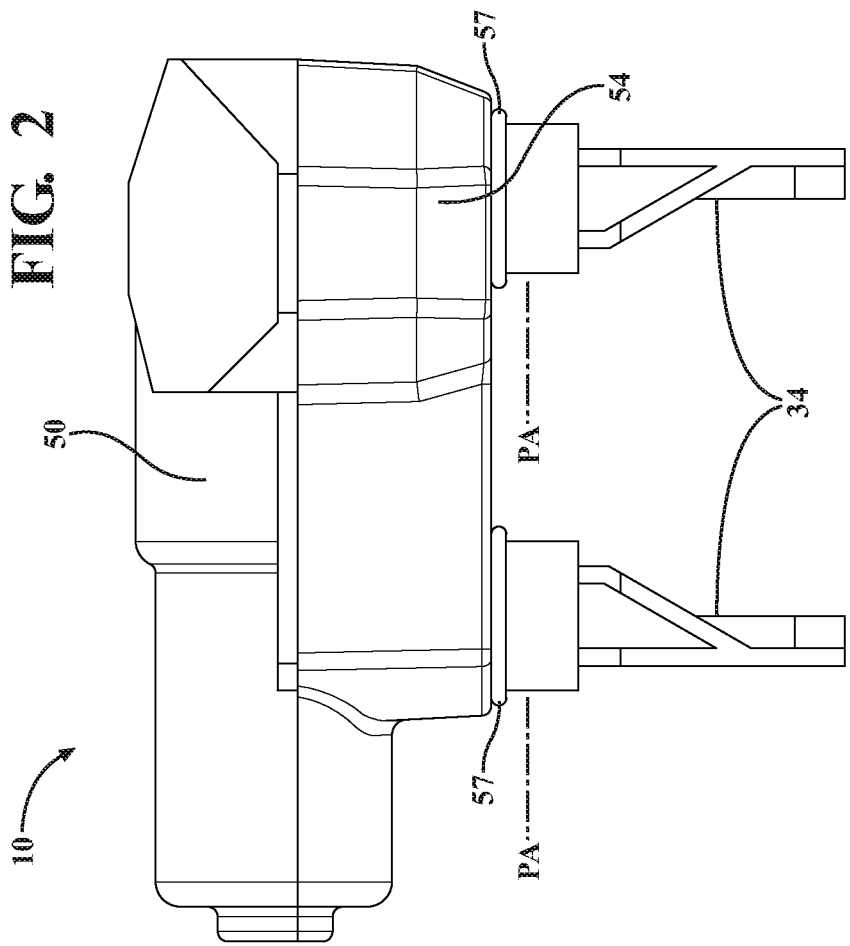
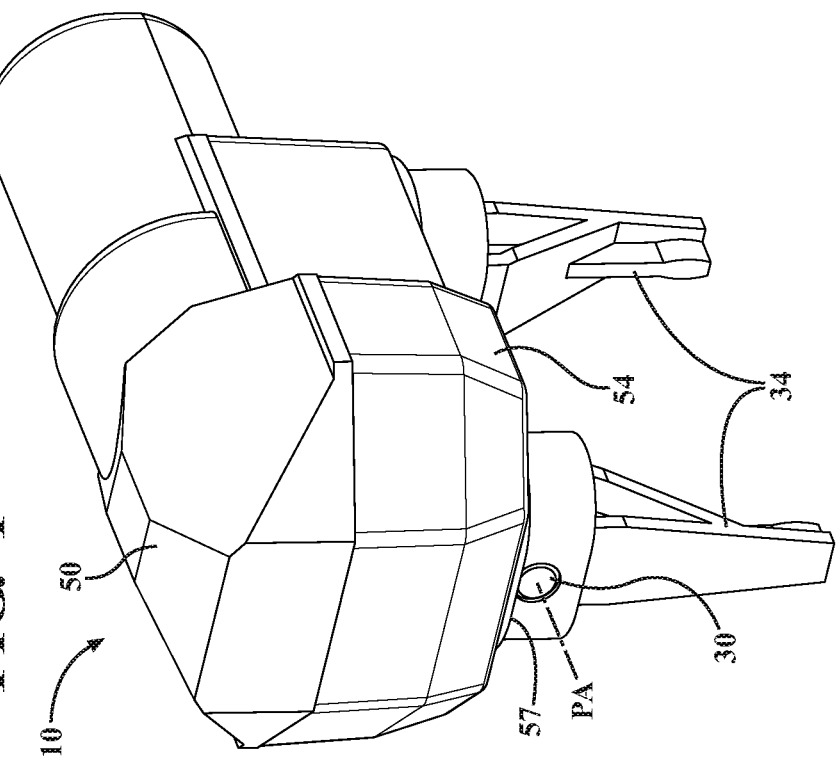

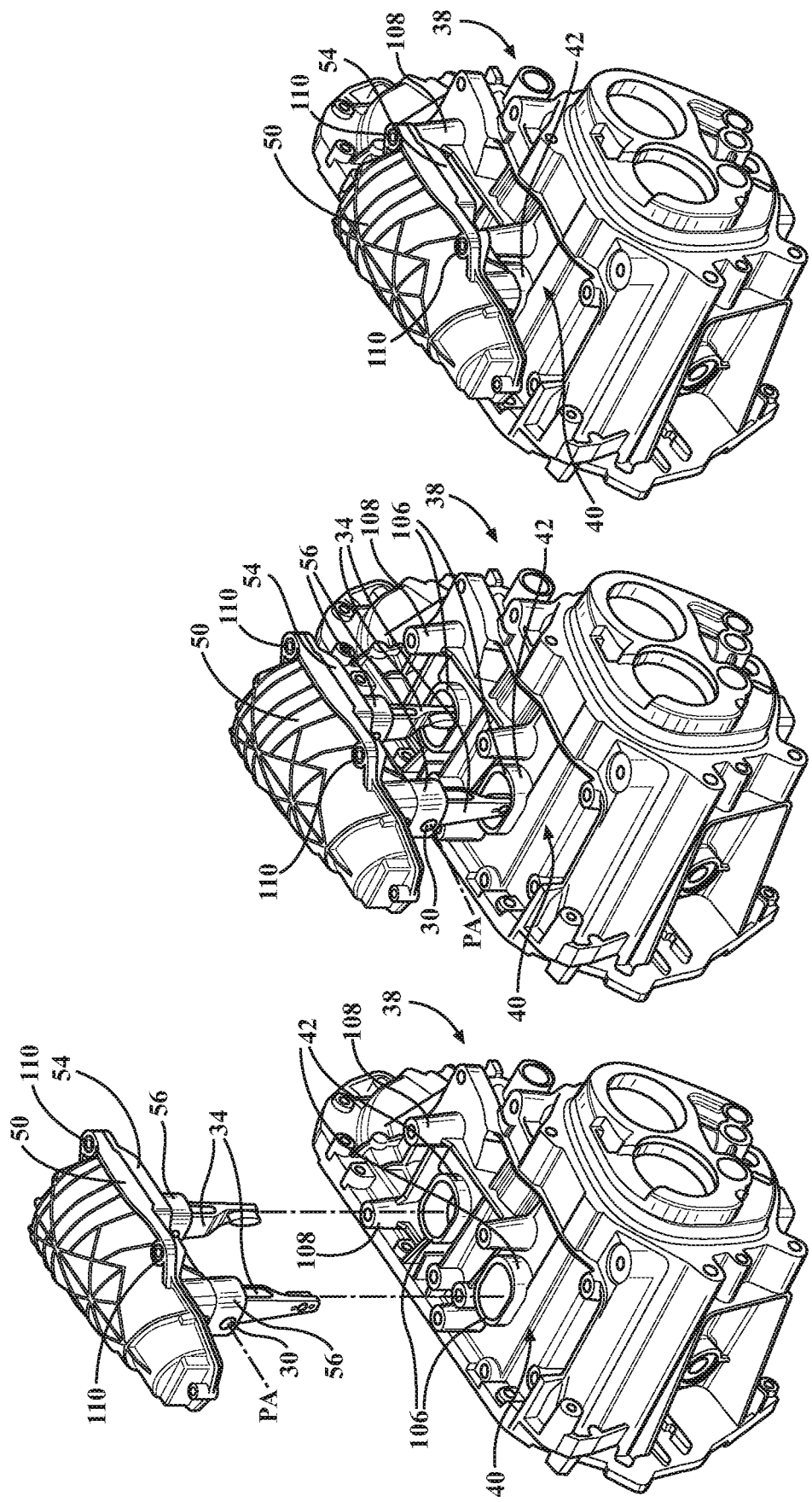

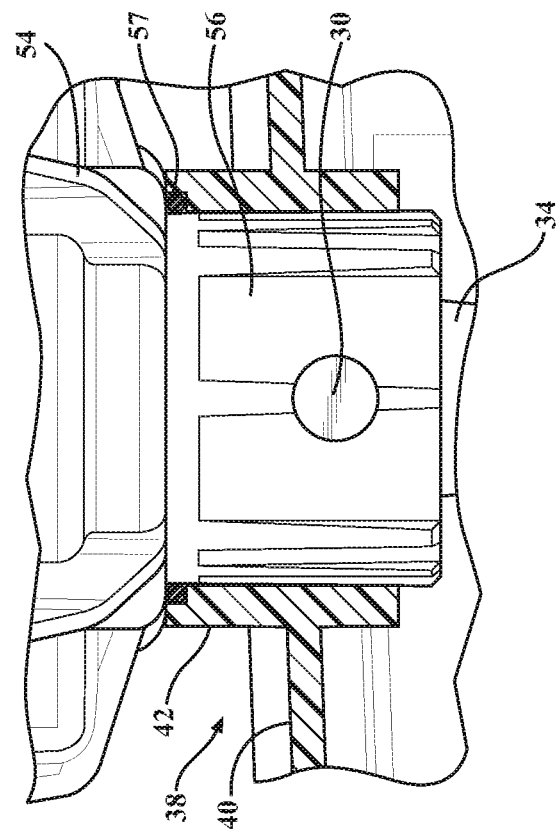
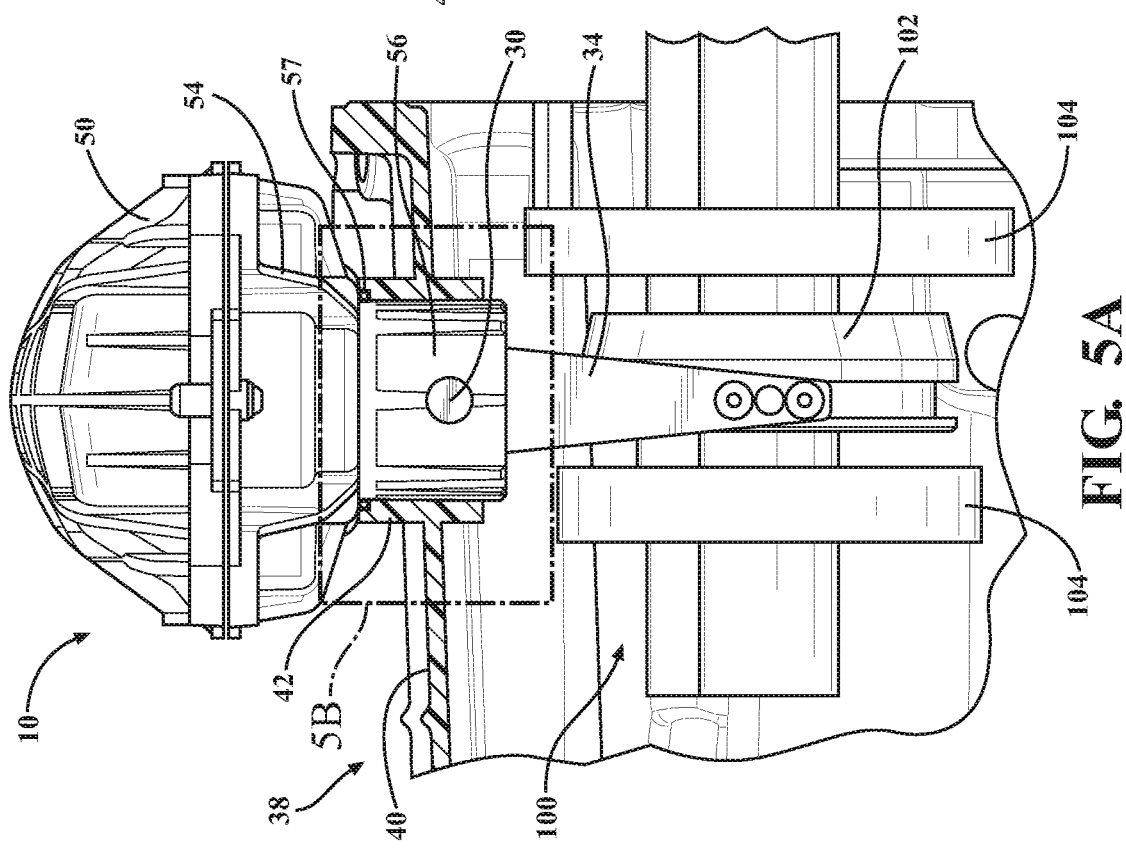

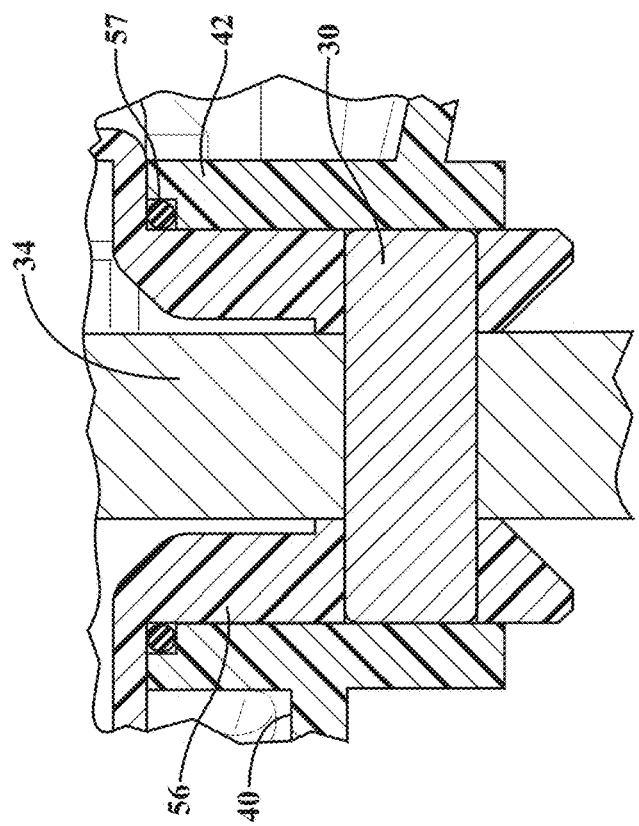
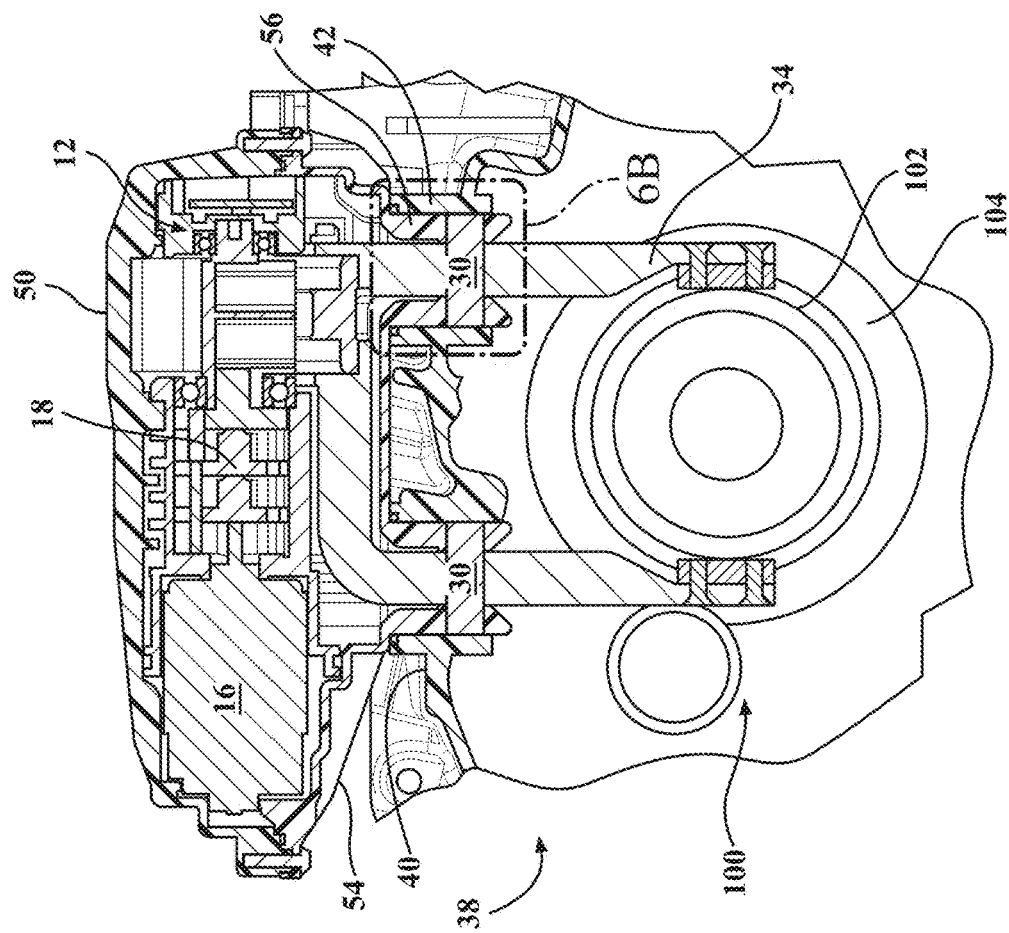
FIG. 6B
FIG. 6A

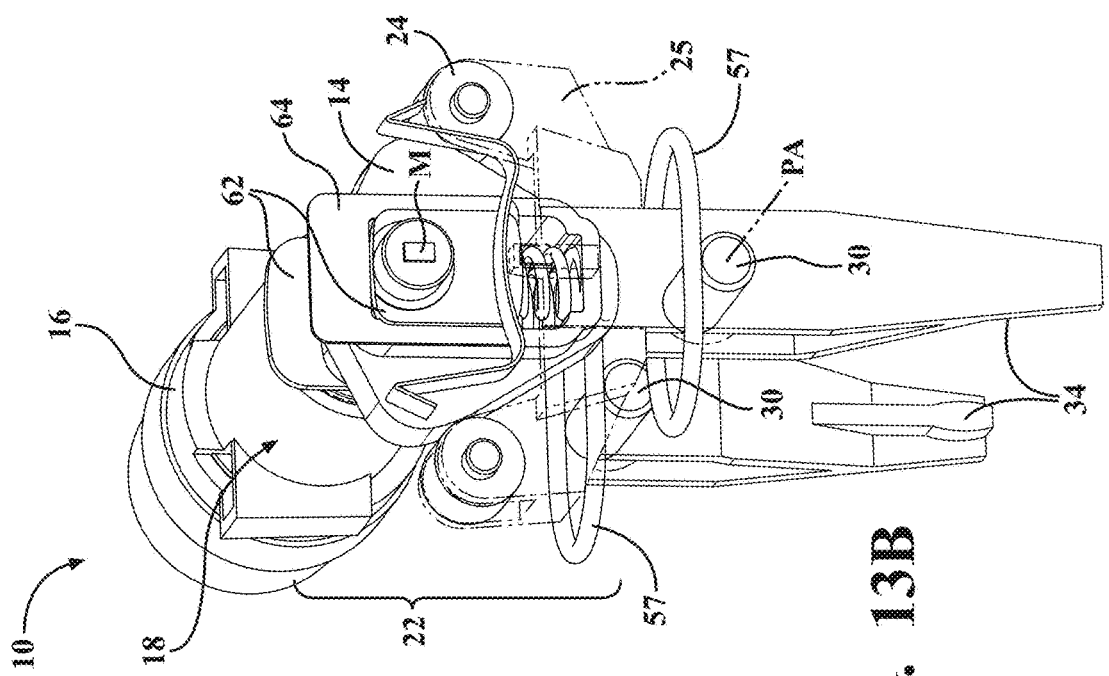
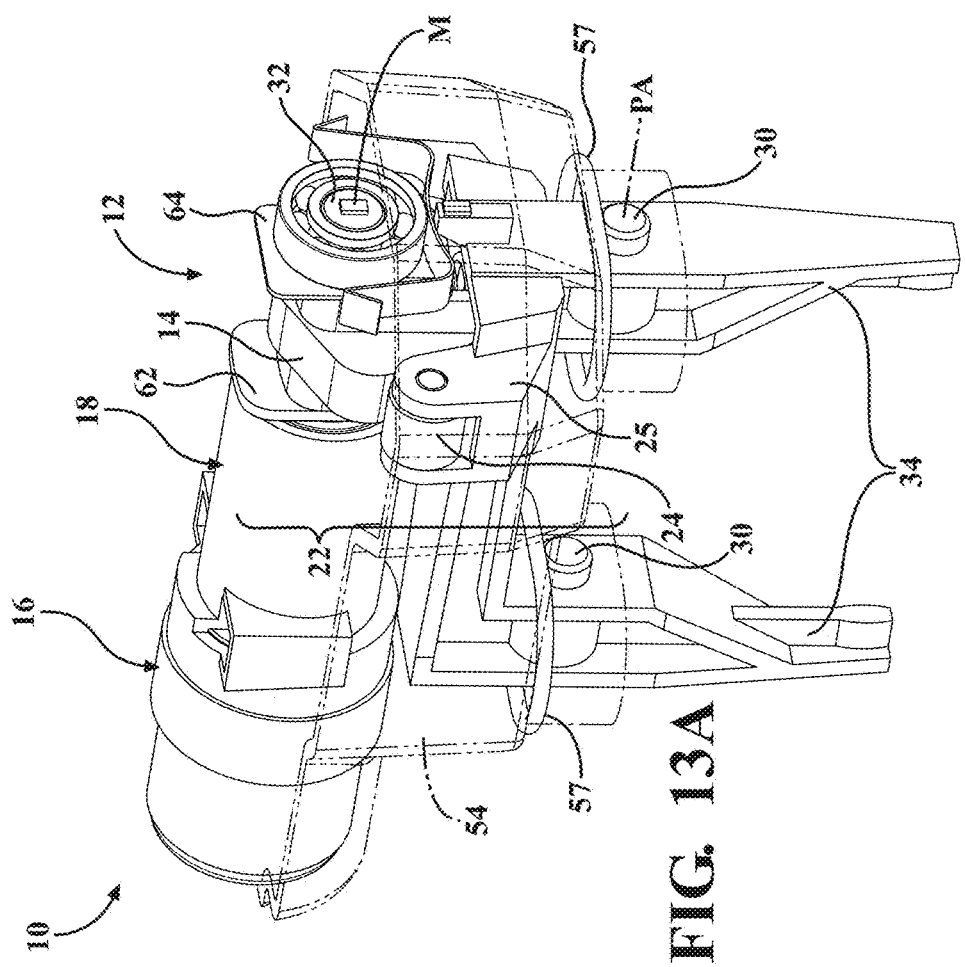
FIG. 13A
FIG. 13B

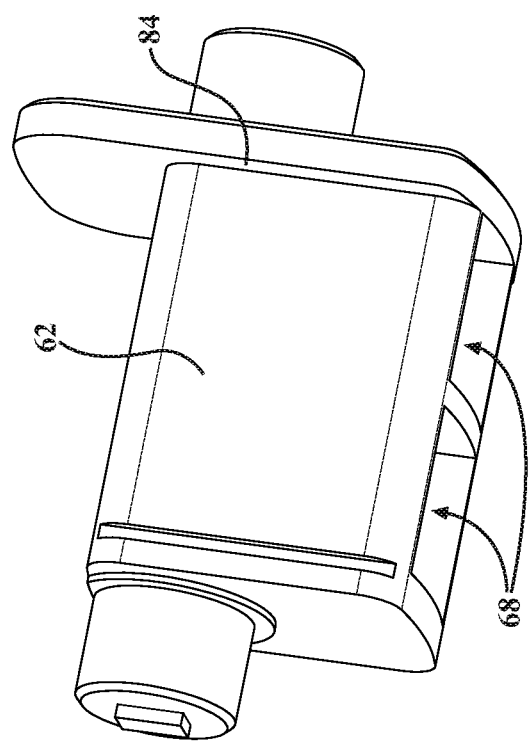
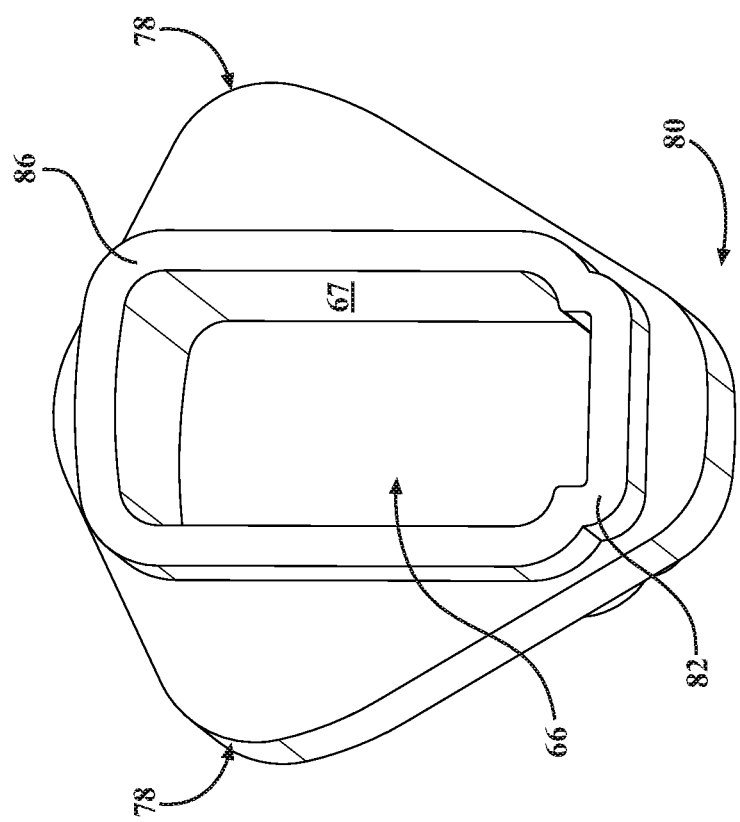

EXTERNAL ACTUATOR SYSTEM

CROSS-REFERENCE TO RELATED APPLICATIONS

The subject patent application is the National Stage of International Application No. PCT/IB2021/059718, filed on Oct. 21, 2021, which claims priority to and the benefit of U.S. Provisional Application No. 63/174,815, filed on Apr. 14, 2021, the entire contents of which are incorporated by reference herein.

TECHNICAL FIELD

The teachings generally relate to an actuator system including an actuation assembly with an integrated fork and spring assist for use with a gear assembly, typically in non-synchronized mechanisms.

BACKGROUND

Generally, gear assembly actuation is done manually or with the assistance of an actuator. However, most examples have separate actuation assemblies from the fork. In actuators utilizing separate actuation assemblies and forks, the integration of the separate components into a gearbox is complex and application specific, presenting the challenge of utilizing one actuator assembly into several applications.

Typically, the actuation member is configured to linearly move a fork connected with a dog clutch between a plurality of positions. The actuator assembly is operated with a manual force (e.g. a standard gearbox where a user selects gears by moving an actuator from position to position) or with an actuator to move a fork connected with a dog clutch between positions. Given the nature of some gear actuation, when a sliding gear is being moved from a disengaged position into engaged with a receiving gear, there is a momentary blockage or misalignment of gear teeth on the sliding gear and the gear teeth on the receiving gear. In this moment of misalignment, the shift fork is pressing the sliding gear against the receiving gear but the sliding gear is not entering the receiving gear, generating resistance against the fork since the sliding gear teeth and the receiving gear teeth are not aligned. The time window for engagement is typically short due to gear assembly design. If time window is not utilized, a stronger motor is required as force becomes higher to force the teeth of the sliding gear into alignment with the teeth of the receiving gear. This uses a larger force and operates slower, which may not seat the sliding gear into the receiving gear as far, and/or cause premature wear and damage on the system.

It would be attractive to have an actuation system which is low cost with a simple integration into several different systems and types on gearboxes. It would be attractive to have a system which provided fast shifts with low force and high acceleration, preventing damage and premature wear. It would be attractive to have a system with an integrated fork and actuator.

SUMMARY

The present teachings solve one or more of the present needs by providing an actuator system with low cost, simple integration into a variety of applications, and fast actuation between positions while applying a low force with exceptional penetration.

The present teachings provide for a system comprising a gearbox including a gear assembly, the gearbox having an outer surface, the outer surface with a pair of apertures; and an actuator. The actuator including a support with at least one pair of lugs, with each lug having an opening; a drive system connected to the support; a shift fork including a pair of arms, the shift fork in communication with the drive system and configured to move a distance defining a stroke length between a disengaged position and an engaged position; and an actuation assembly operatively connected with the drive system to move the shift fork between a neutral position, and a shifted position, with a plurality of intermediate positions between the neutral and shifted positions. The actuator is mounted onto the outer surface of the gearbox, with the pair of lugs extending into the pair of apertures of the gearbox, and at least a portion of the shift fork extends extending through the lugs into and below the outer surface of the gearbox. The portion of the shift fork within the gearbox engages a gear assembly within the gearbox.

The present teachings provide for an actuator comprising a support including an outer surface and an inner surface, the support having at least one pair of lugs extending from the outer surface of the support, and each lug having an opening, a drive system connected with the inner surface of the support, a shift fork pivotally mounted to the pair of lugs and extending outward through the openings, the shift fork operatively connected with the drive system to move the shift fork between a neutral position, and a shifted position, with a plurality of intermediate positions between the neutral and shifted positions. The shift fork extends through the openings of the pair of lugs from the inner surface from the outer surface of the support.

BRIEF DESCRIPTION OF THE DRAWINGS

FIG. 1 is a perspective view of an actuator system with integrated fork.

FIG. 2 is a side view of the actuator with integrated fork.

FIGS. 4A-4C illustrate an actuator with integrated fork connecting with the outer surface of the gearbox.

FIG. 5A is a partial longitudinal cross-section view of a section of the actuator system connected with the gearbox and a gear assembly.

FIG. 5B is an enlarged view of FIG. 5A at the connection area between the actuator and the gearbox case.

FIG. 6A is a partial lateral cross-section view of the actuator connected with the gearbox and the gear assembly.

FIG. 6B is an enlarged view of a portion of FIG. 6A at the connection area between the actuator and the gearbox case.

FIGS. 13A and 13B illustrate perspective views of the actuator without a cover.

FIG. 19 is a perspective side view of the cam.

FIG. 20 is a perspective view of the hub.

DETAILED DESCRIPTION

Figure 3:
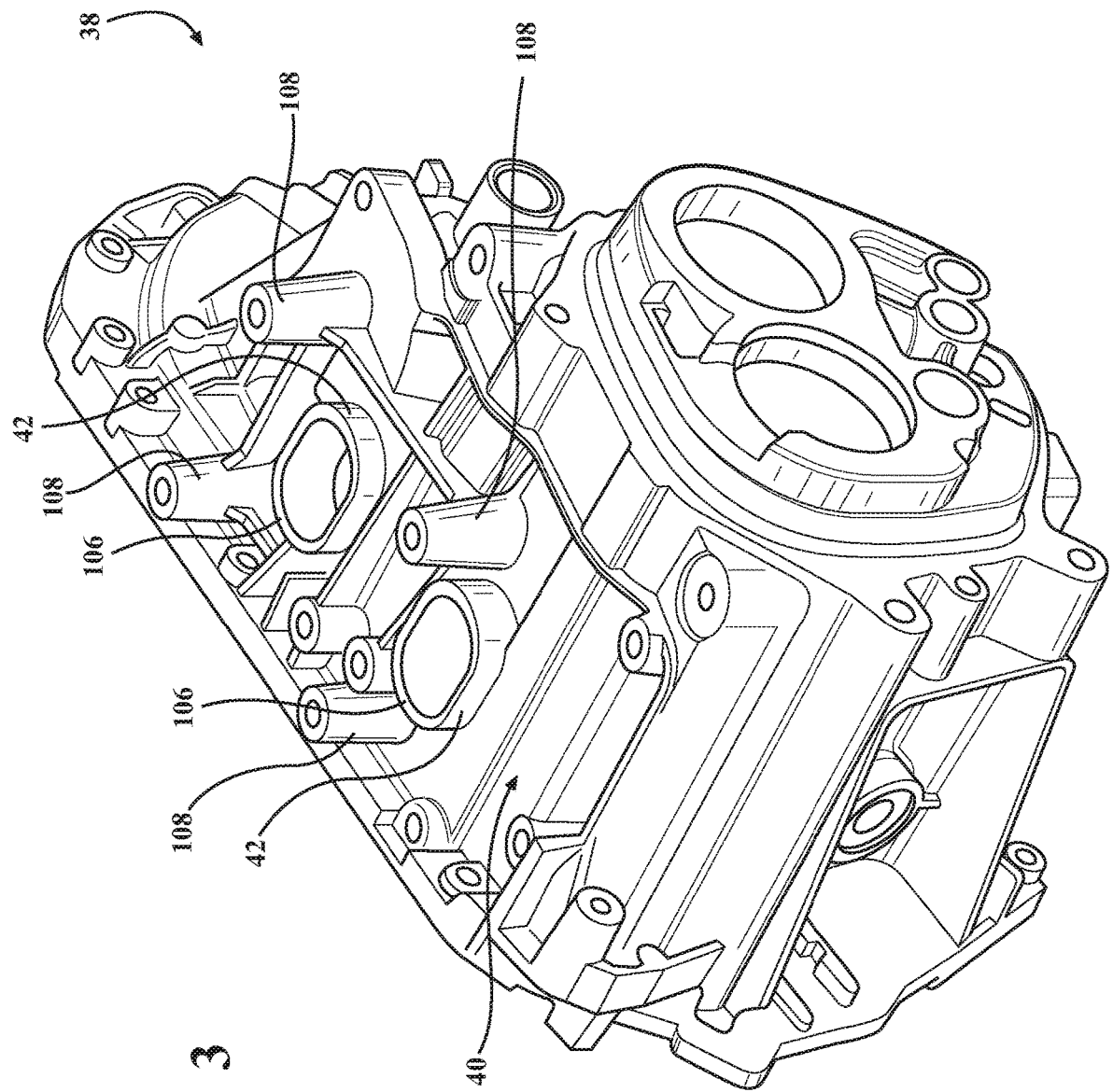
FIG. 3 is a perspective view of a gearbox.
Figure 8:
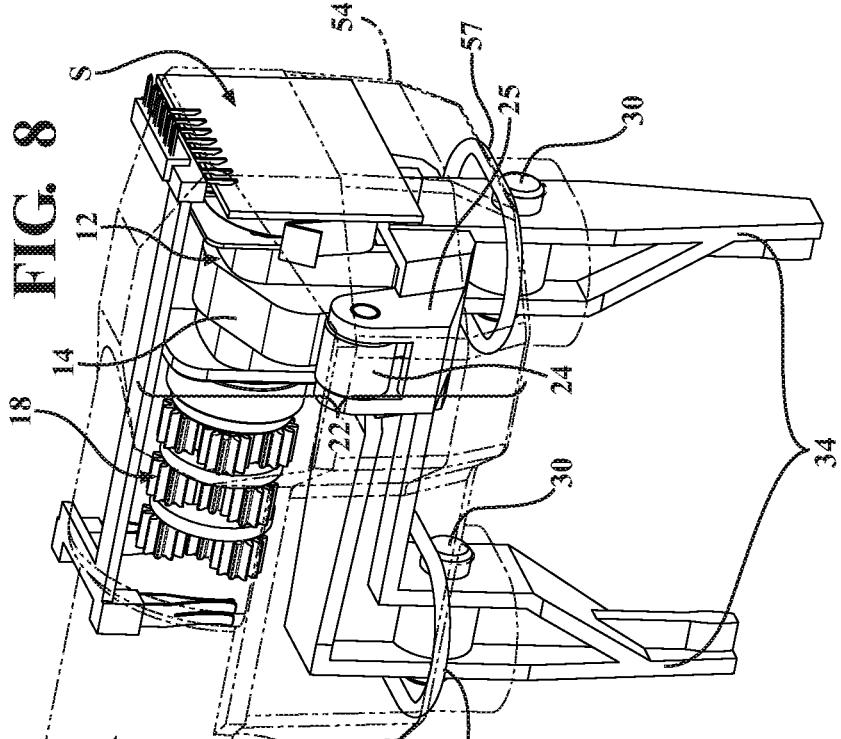
FIG. 8 is a perspective view of the actuator system and associated components with the support shown in phantom.
Figure 7:
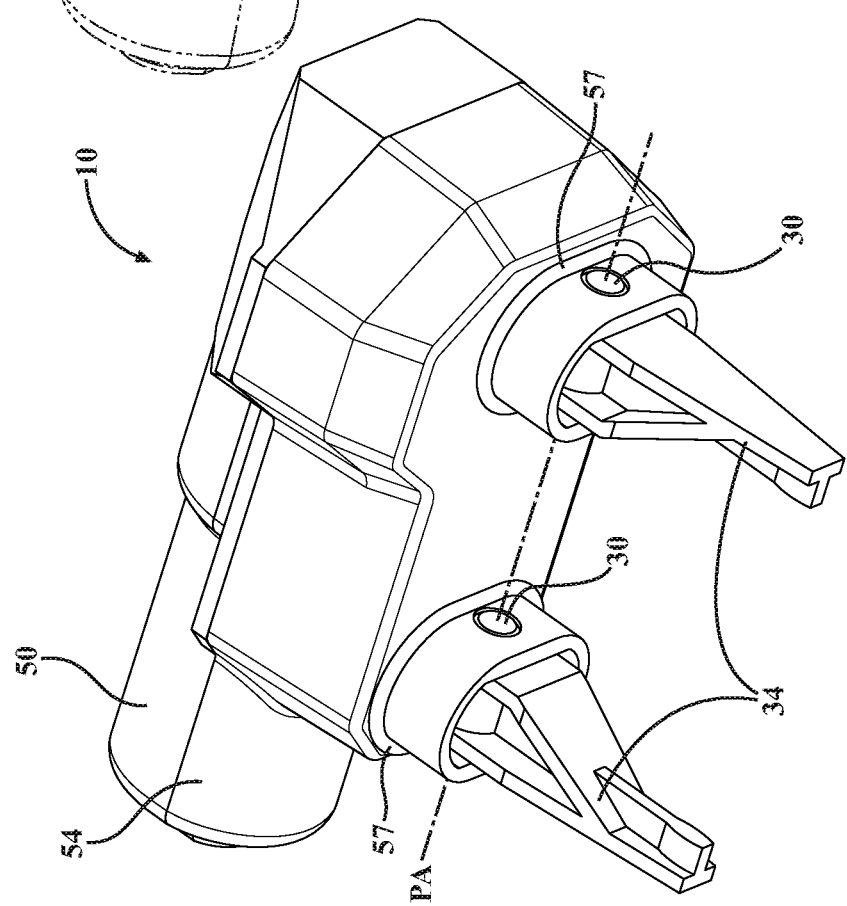
FIG. 7 is a perspective view of the actuator and integrated fork.
Figure 9:
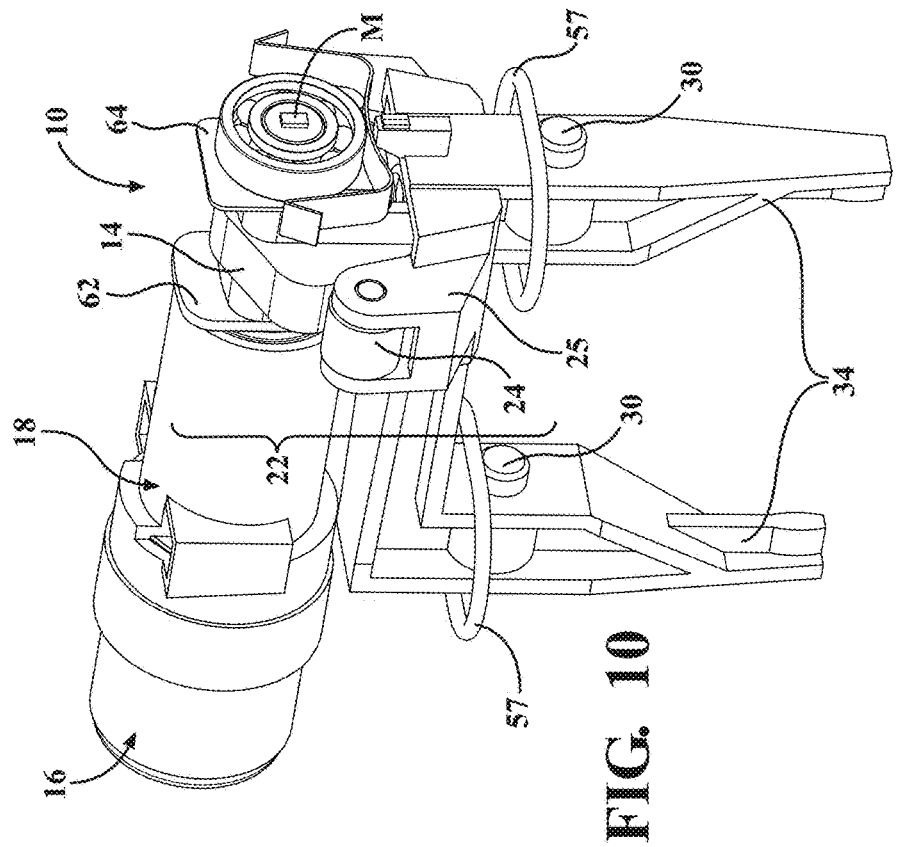
FIG. 9 is a perspective view of the actuator system without the cover and the support shown in phantom.
Figure 10:
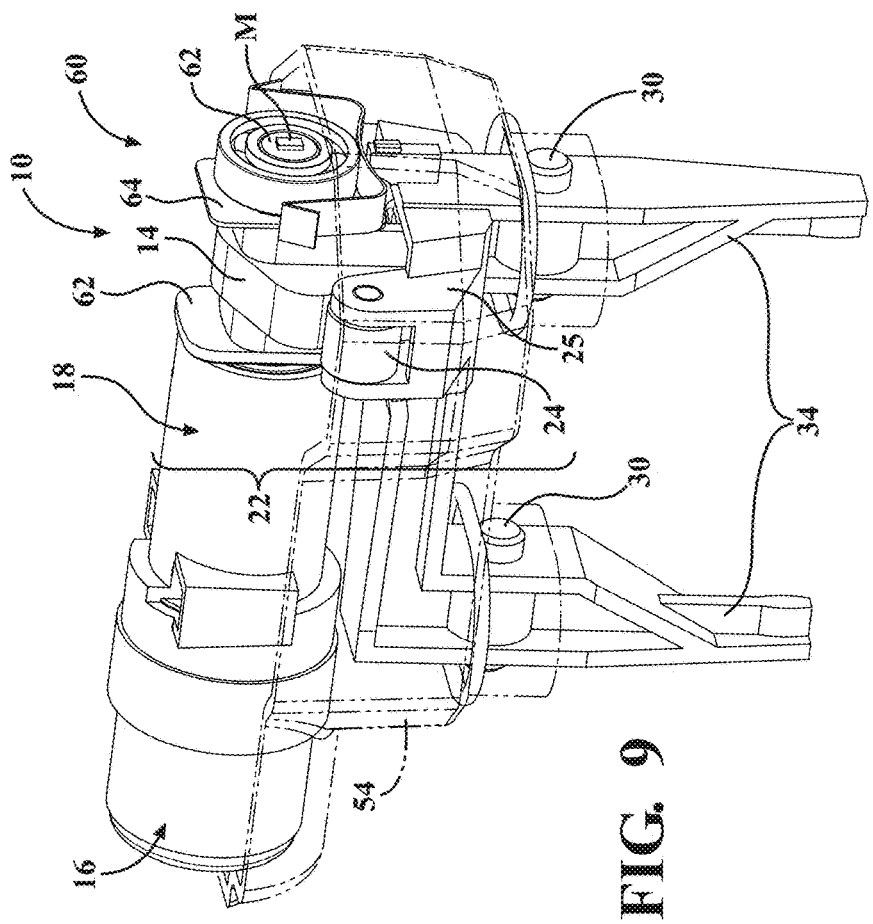
FIG. 10 is a perspective view of the actuator without the cover and the support.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to an actuator 10 (also referred to as the actuator system). The actuator 10 includes an actuation assembly 22 that functions to move at least one shift fork adapted to connect with a dog clutch 102 between a disengaged position 44 and one or more engaged positions 46. The actuator 10 may be attached to a transmission, a transfer case, an axle, a gearbox, a controller, the like, or a combination thereof. The actuator 10 may be used in automobiles, autonomous vehicles, robots, trucks, marine vessels, or any other vehicle or machine that utilizes moving gears. The actuator system 10 may be used on any device that couples two rotating shafts, gears, or other rotating components. The actuator system 10 may be used in conjunction with multiple actuator systems. For example, a transmission may have a first actuator system which actuates a first gear and a second gear, and a second actuator system which actuates a third gear and a fourth gear. It is contemplated in some examples that each actuator system moves a dog clutch 102 into communication with one or more receiving gears 104.

The actuator 10 is shown in FIGS. 1-2 and 7-8 in a perspective view. The actuator 10 includes a base or a support 54 and a housing or a cover 50. The support 54 and the cover 50 form a cavity therebetween. The housing has a relatively low profile, minimizing the amount of space needed to house the actuator system 10. In some nonlimiting examples, the height of the housing may be less than 150 mm, less than 125 mm, less than 100 mm, or even less than 90 mm. The at least one shift fork 34 extends from through the support 54, configured to slide inside of a gearbox and operatively couple with a dog clutch 102. The at least one shift fork 34 is pivotally coupled with the support 54. The actuator 10 is configured to mount to the surface 40 of a gearbox 38, which is shown in FIGS. 4A-4C and partially shown in FIGS. 21A-22C.

The support 54 includes at least one pair of lugs 56, each lug extending away from the support 54, having an opening extending from the cavity formed between the support 54 and the cover 50. Each of the lugs 56 has an opening and an outer surface. The lugs each form a passage from the inner portion of the cavity. The lugs 56 may have any suitable shape. In some examples, the lugs 56 may have an oval profile, such as shown in 1-2 and 4A-4C. The lugs 56 each having a shape to allow the shift fork 34 to move between the neutral position and shifted position. The lugs 56 assist in mounting the actuator 10 to the outer surface 40 of a gearbox 38. The lugs 56 provide a passage from the cavity for at least a portion of the actuation assembly 22 (e.g. fork 34) to pass through into the gearbox 38. Each lug 56 is axially disposed around a portion of the shift fork 34. The lugs 56 may connect with and provide a pivot point 30 to the shift fork 34, described further below. The shift fork 34 is pivotally mounted to the pair of lugs 56.

As seen in FIG. 3, the gearbox 38 have a pair of apertures 42 in the surface 40 to allow at least a portion of the actuator 10 and the shift fork 34 to pass into the gearbox 38. The holes on the gearbox are small in order to maintain structural rigidity and strength. Similarly, the shift fork 34 is sized to pass through the apertures 42 on the surface 40 of the gearbox 38. The shift fork 34 is shown below a partial view of the gearbox surface 40 in schematic FIGS. 21A-21C and 22A-22C, while the remainder of the actuator 10 is above the surface 40 of the gearbox 38. FIG. 3 illustrates a perspective view of a gearbox 38 showing the pair of apertures 42 as bosses extending from the outer surface 40 of the gearbox. In some examples, the gearbox 38 includes a gear assembly 100, configured as a dog clutch assembly, which is illustrated in FIGS. 5A and 6A. The apertures 42 located on the outer surface 40 of the gearbox 38 provide passages to receive the shift fork 34 and at least a portion of the support 54. The apertures 42 function to assist in mounting the actuator 10 to the gearbox 38. The apertures 42 are shaped to allow the shift fork 34 to move between positions 44, 46, 48, in order to shift the gear assembly 100.

FIGS. 4A, 4B, and 4C show the actuator system 10 connecting with the gearbox 38. FIG. 4A depicts the shift fork 34 of the actuator system 10 aligned with the apertures 42. The lugs 56 and the apertures 42 have complimentary shapes, the apertures 42 sized larger than the lugs 56 in order to receive the lugs 56. The apertures 42 include a sealing surface 106 for mating with the seal 57 located around each lug 56 and on the bottom surface of the support 54. The sealing surface 106 and the seal 57 work in concert to keep the actuator 10 sealed with the gearbox 38 to prevent unwanted particles and debris from entering the gearbox 38, and to prevent fluid from escaping the gearbox. The gearbox 38 includes fastener posts 108 and the actuator 10 includes fastener holes 110. Both the fastener posts 108 and the fastener holes 110 are axially aligned to receive fasteners to secure the actuator system 10 to the gearbox 38 when the actuator system 10 is connected with the gearbox 38.

FIGS. 5A and 6A are partial cross-sectional views of the actuator 10 and the gearbox 38. FIG. 5A shows a partial longitudinal cross-section of the actuator system 10 and the gearbox 38. Similarly, FIG. 6A shows a partial lateral cross-section of the actuator 10 and the gearbox 38. The actuator 10 passes at least a portion of the shift fork 34 and the lugs 56 through the outer surface 40 of the gearbox 38 to connect the shift fork 34 with the gear assembly 100 (shown in FIGS. 5A and 6A). When the actuator 10 is connected with the gearbox 38, the lugs 56 are disposed within the apertures 42, and the bottom of the support 54 and the sealing surface 106 press against the seal 57, creating a secured connection. Each seal 57 mates with a corresponding seal surface 106 on each of the pair apertures 42. The lug 56 and the pivot 30 can be seen in FIGS. 5A and 6A disposed below the surface 40 of the gearbox 38. When connected, as shown in FIG. 5A, the shift fork 34 engages the dog clutch 102 (also referred to as slider gear) to move the dog clutch 102 through positions 44, 46, 48 into and out of engagement with receiving gear(s) 104. FIG. 5B illustrates a close up of the lug 56 within aperture 42. The pivot 30 is below the outer surface 40 of the gearbox 38, disposed within the aperture 42, allowing the shift fork 34 to move between positions 44, 46, 48. The lug 56 and the bottom of the support 54 sealed with the aperture with seal 57. Each of the pair of lugs 56 includes seal 57 surrounding a perimeter of each of the lugs 56. In some examples, seal 57 may be an O-ring. In other examples, seal 57 may be a gasket. The seal may be deformable.

FIG. 6A shows the partial lateral cross-sectional view of the actuator 10 and the gearbox 38. FIG. 6A illustrates a cross-sectional view of the actuator 10 connected with the gear assembly 100. As explained further below, the cam assembly 12 and actuation assembly 22 work to move the dog clutch 102 between positions 44, 46, 48 by pivoting shift fork 34 between positions. FIG. 6A illustrates the pair of arms of the shift fork 34 each disposed within one of the pair of lugs 56, each arm pivotally connected 30 to a corresponding lug of the pair of lugs 56. The shift fork 34 is shown engaging both sides of the dog clutch 102. The lugs 56 and apertures 42 are sized and shaped to allow the shift fork 34 to move between positions 44, 46, 48. The apertures 42 and the lugs 56 are spaced apart such that the shift fork 34 may pass through the openings, so that the pads 36 on the shift fork 34 engage either side of the dog clutch 102. The arms of the shift fork 34 are spaced apart corresponding to the size of the dog clutch 102. FIG. 6B is a close-up lateral view of a lug 56 retained within the aperture 42 with the pivot 30 below at least a portion of the outer surface 40 of the gearbox 38. In some examples, the pivot connection 30 is below the outer surface 40 of the gearbox 38.

Turning to FIGS. 9 through 13B, the actuator 10 includes a cam assembly 12 of any suitable design or configuration. The cam assembly 12 functions to actuate the shift fork 34 between a neutral position, an intermediate position, and a shifted position, moving the shift fork from the disengaged position 44 to the engaged position 46.

The actuator 10 includes a drive system preferably comprising a motor 16, a gear set 18, and an output 15. The motor 16 functions to rotate a gear set 18 which in-turn rotates the output 15, turning the cam assembly 12. The motor 16 may function to receive a signal from a controller to rotate clockwise or counterclockwise depending on the pivotal movement required to move the shift fork 34 between positions 44, 46. The motor 16 as shown in the figures is an electric motor, however, any suitable means for actuating the cam assembly 12 is contemplated, such as a pneumatic actuator, hydraulic actuator, a manual actuation, or the like. The motor 16 is configured to rotate a gear set 18 which rotates the cam assembly 12.

Figure 12:
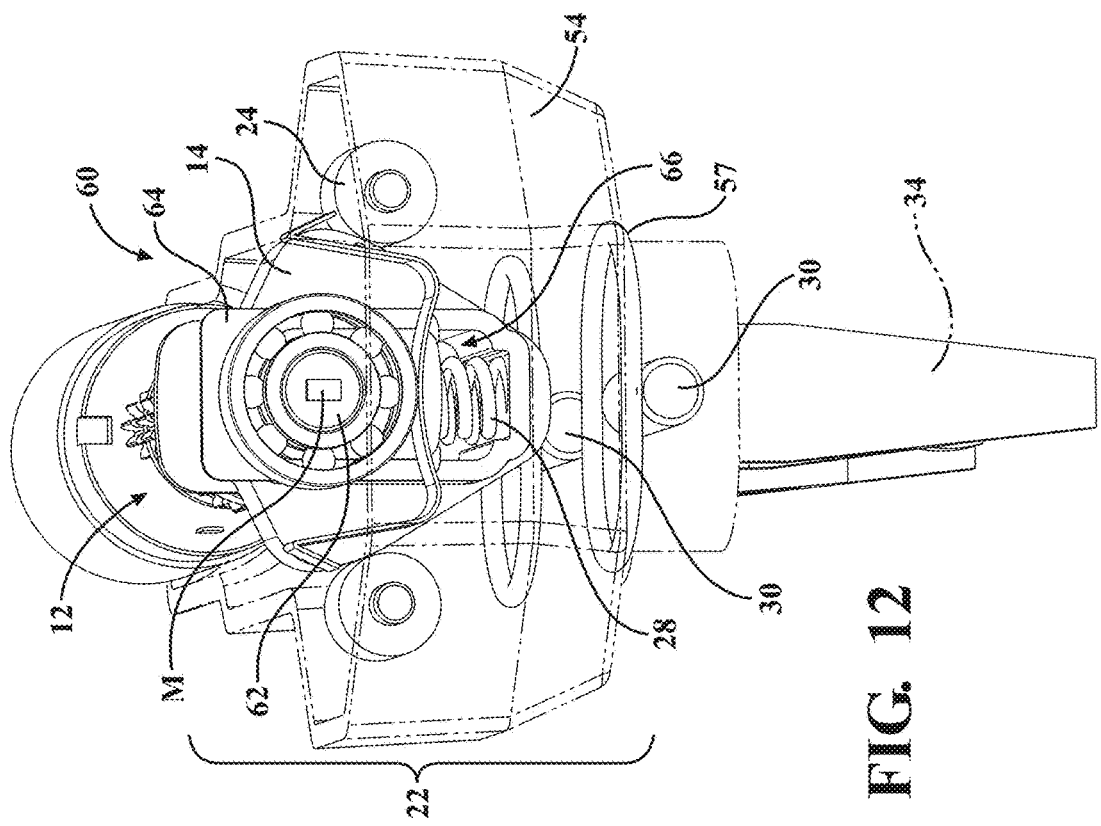
FIG. 12 is an end view of the actuator.
Figure 11:
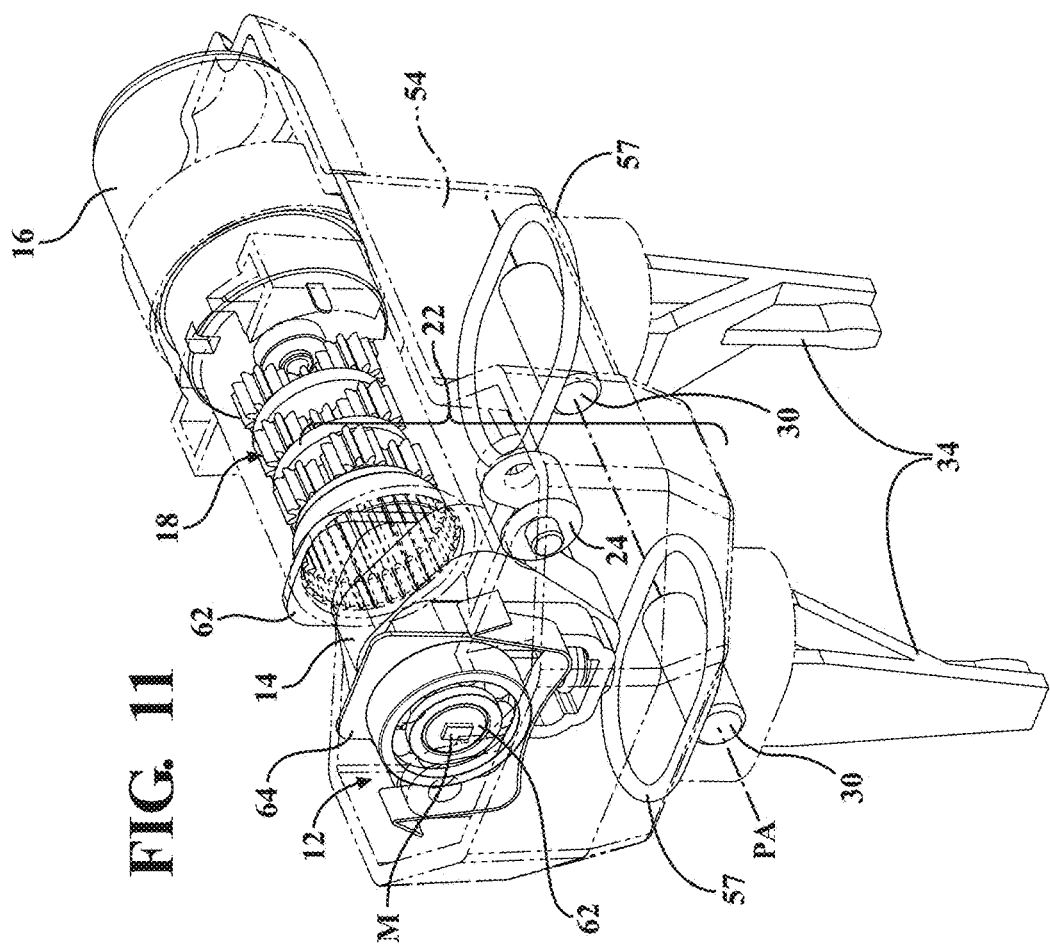
FIG. 11 is a perspective view of the actuator system without the cover and the support in phantom showing the gear set.
Figure 14:
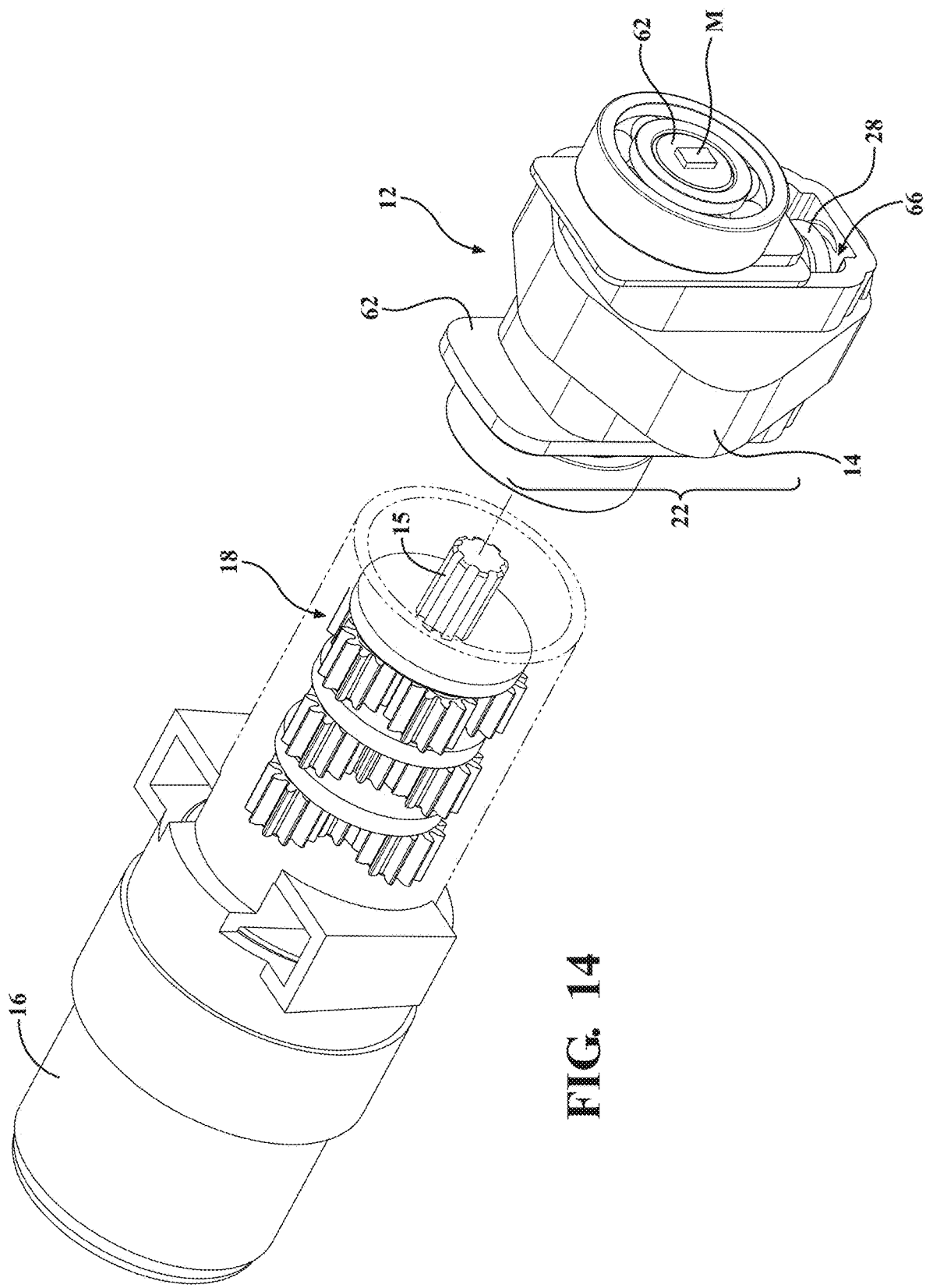
FIG. 14 is a perspective view of the actuator motor and gearset connected with a portion of the actuation assembly.
Figure 21C:
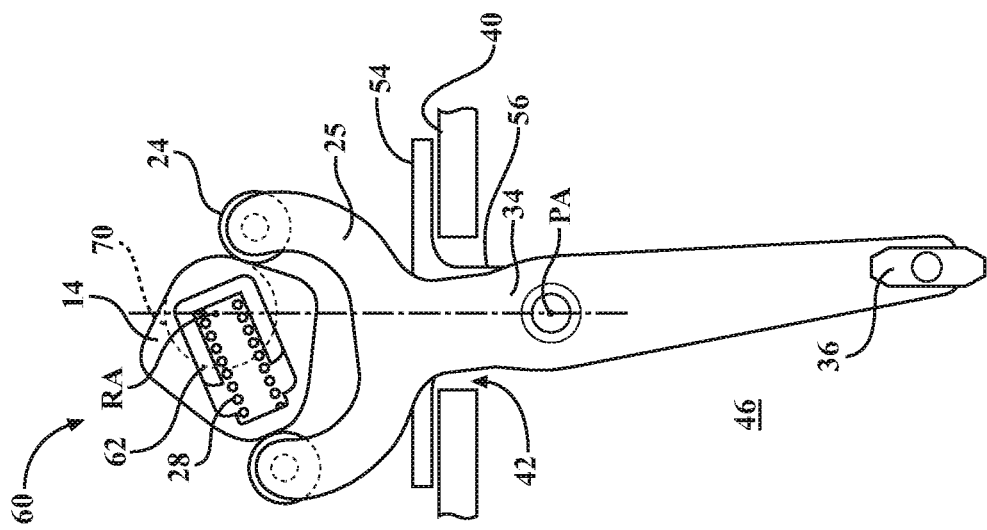
FIGS. 21A-21C illustrate schematic end views of the actuator in a disengaged position, an intermediate position, and an engaged position, respectively.
Figure 21B:
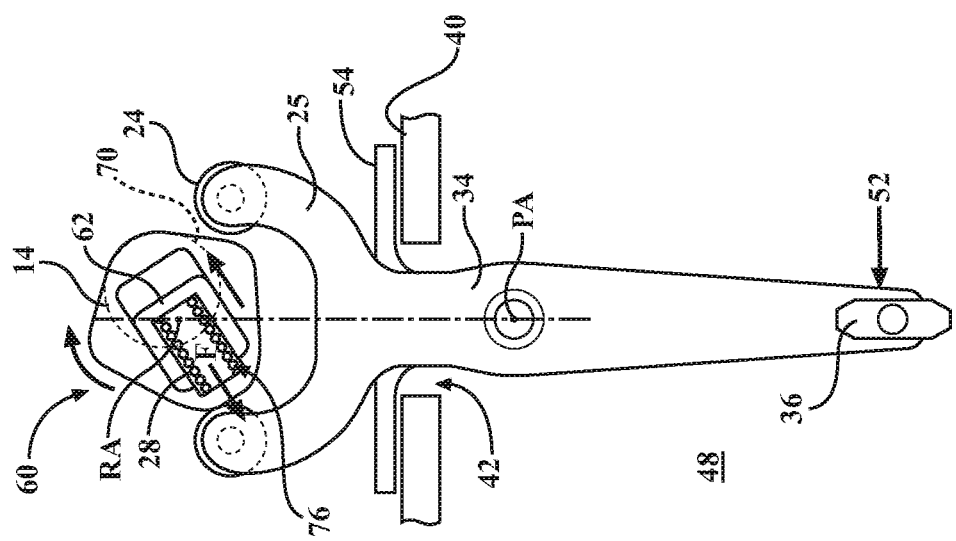
Figure 21A:
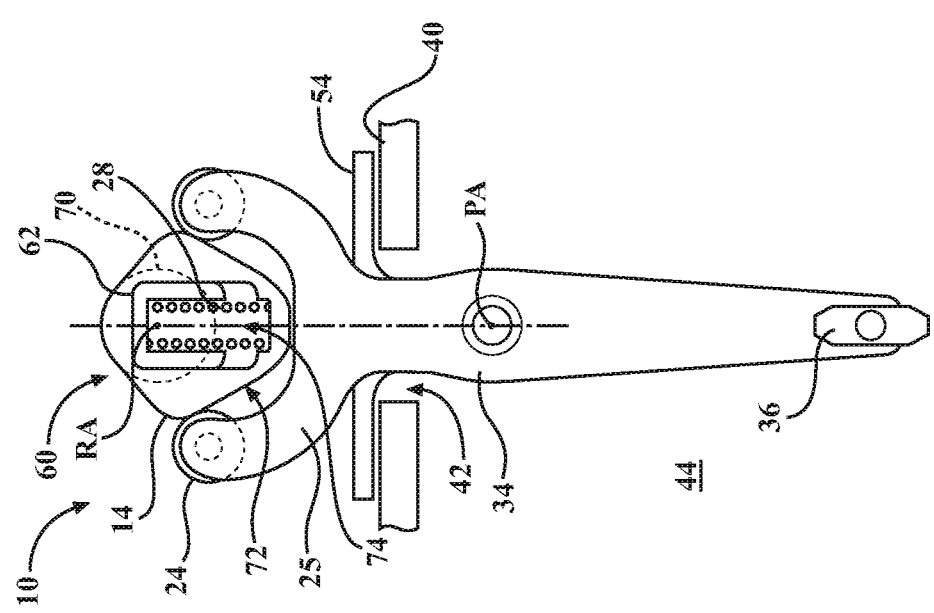

As best seen in FIGS. 11, 12, and 14, the actuator 10 includes a gear set 18 to amplify torque generated by the motor 16 to increase the rotational torque of the cam 14. The actuator 10 also includes an actuation assembly 22 in communication with the cam assembly 12. The actuation assembly 22 functions to be moved by the cam assembly 12 to pivot and move the shift fork 34 between positions 44, 46, 48 (FIGS. 21A-21C). The actuation assembly 22 at least includes a shift fork 34, one or more pivot couplers 30 connecting the shift fork 34 to the support 54. The shift fork 34 may include one or more cam followers 24 and an actuator bracket 25 configured to hold and position the one or more cam followers 24.

Figure 15B:
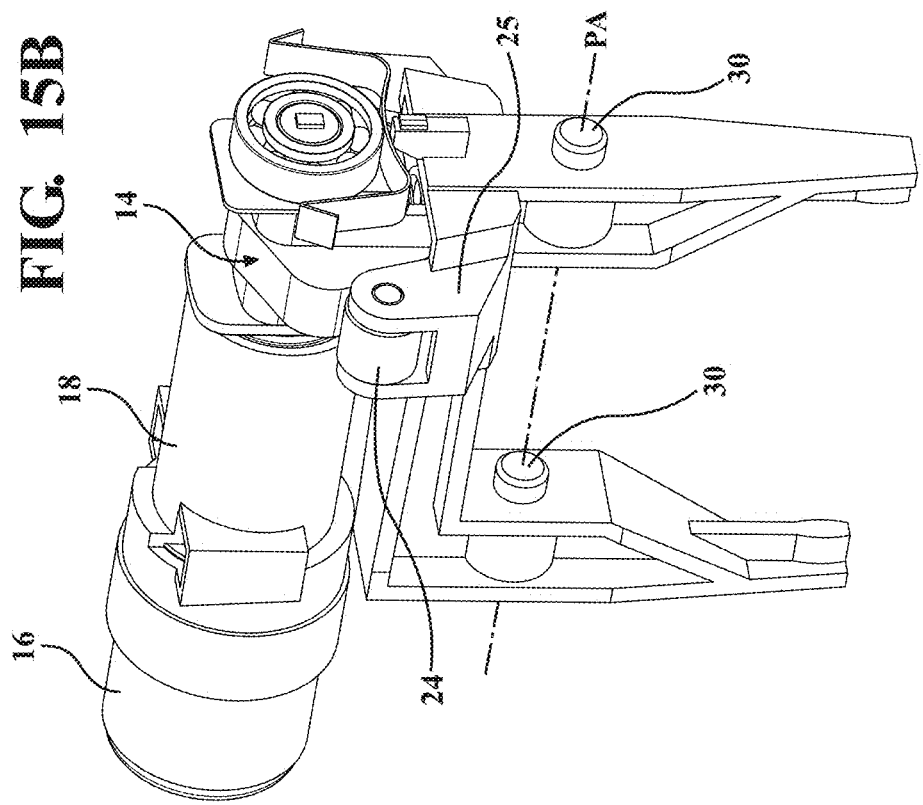
FIG. 15B is a perspective view of the actuator without the cover and the support.
Figure 15A:
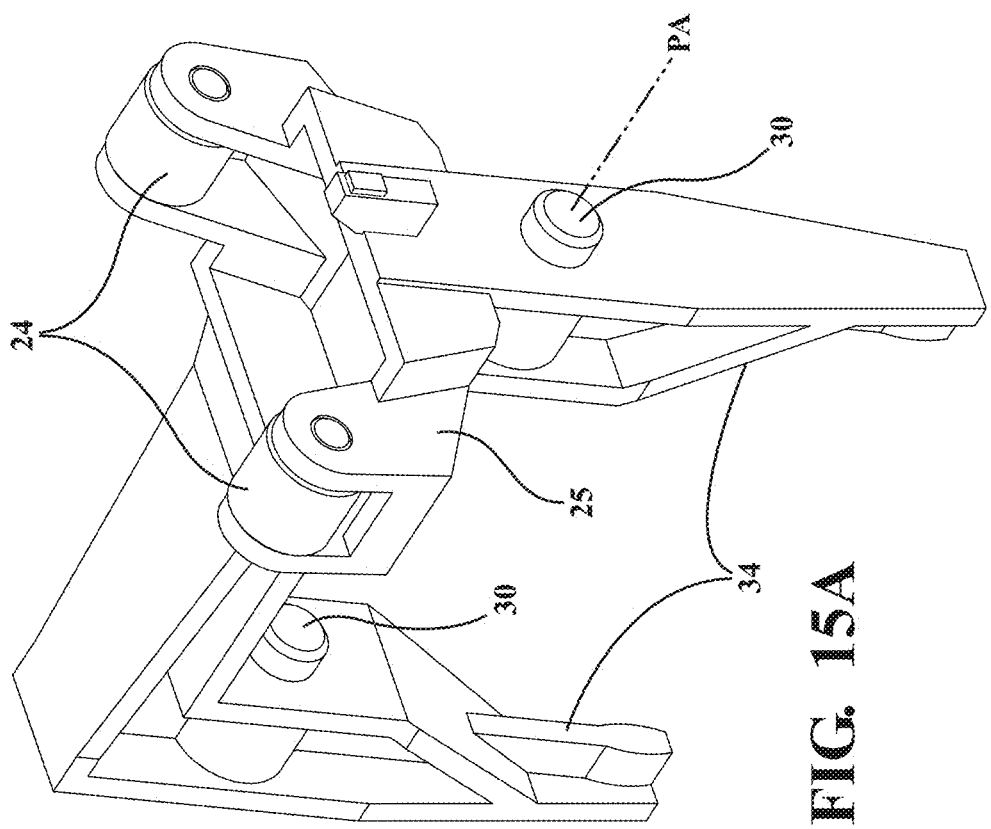
FIG. 15A is a perspective views of the shift fork.
Figure 16A:
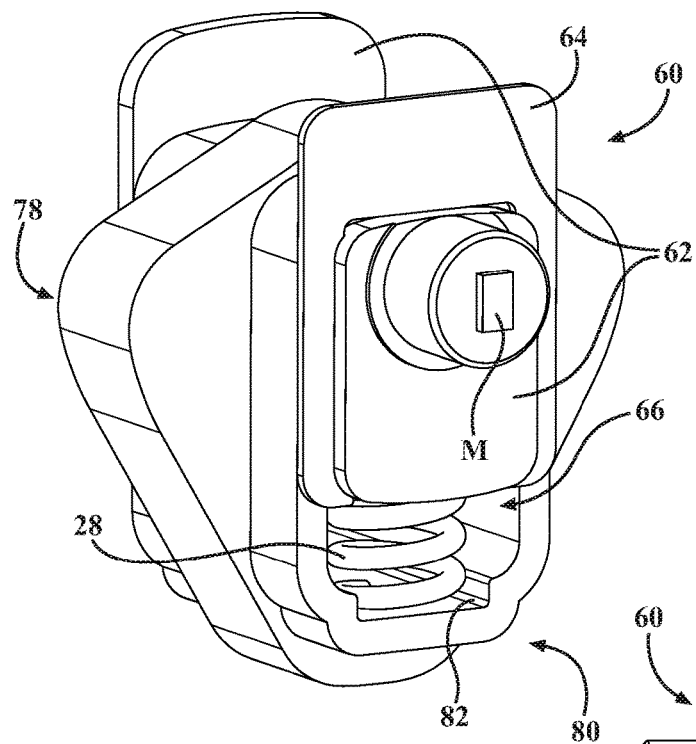
FIG. 16A is a perspective view of the hub assembly.
Figure 16B:
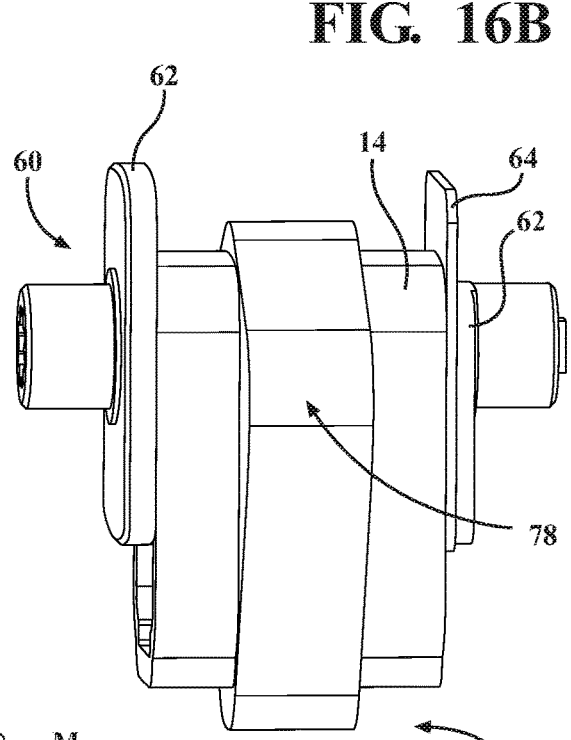
FIG. 16B is a side view of the hub assembly.
Figure 16C:
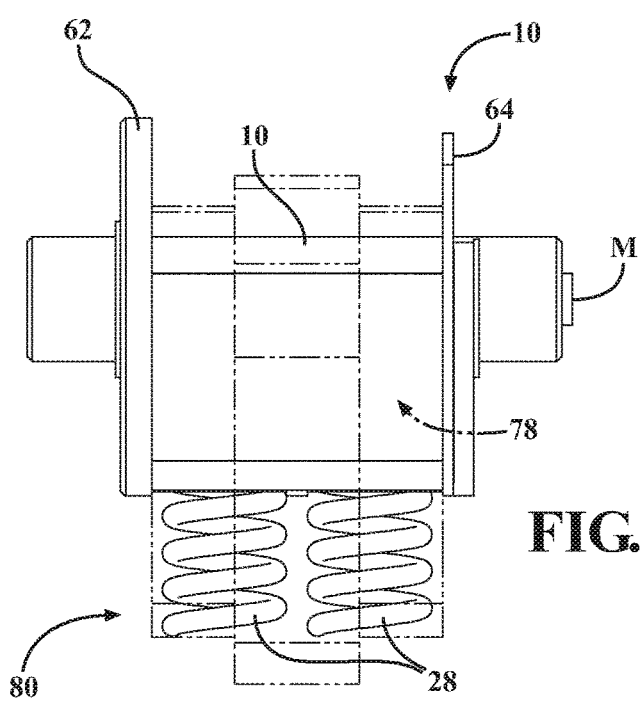
FIG. 16C is a side view of the hub assembly with the hub in phantom.

Turning to FIGS. 15A and 15B, the shift fork 34 is configured to pivot between a plurality of positions and may be configured to move a dog clutch 102 between the plurality of positions, particularly into and out of engagement with one or more receiving gears 104. The shift fork 34 may have a general u-shape or c-shape, comprising a top surface and two arms disposed perpendicularly from the surface, reaching towards and engaging the dog clutch 102.

The cam assembly 12 includes a cam 14. The cam 14 may function to actuate the cam follower 24, the actuator bracket 25, and the shift fork 34. The cam 14 has a base circle 70 disposed around a rotational center of the cam 14 which rotates about a rotation axis RA and a follower portion 72 designed to interact with the cam follower 24 attached with the actuator bracket 25 to move the shift fork 34 between positions 44, 46, 48.

The cam 14 may be configured to radially move relative to the rotation axis, changing the position of the cam 14 relative to the rotational axis (explained further below). The cam 14 may be designed to contact and move the cam follower 24 and actuator bracket 25 a specific distance, pivoting the shift fork 34 between positions 44, 46, 48, moving the dog clutch 102 into or out of contact with the receiving gear 104. The cam 14 may be connected with and rotated by the gear set 18. The cam 14 may include one or more biasing member mounts 82 to receive one or more biasing members 28.

The biasing members 28 functions to assist the actuation assembly 22 in rapidly moving the actuation assembly 22 between the disengaged position 44 and the engaged position 46. The biasing members 28 may function to assist the shift fork 34 in overcoming a momentary blockage condition by storing potential energy in the biasing members 28 when compressed and releasing that energy as a force onto the cam follower 24 and the shift fork 34 (FIGS. 21B and 21C). The one or more biasing members 28 may be part of the hub assembly 60 described further below. The biasing members 28 may be configured to have a length in an expanded state configured to push the shift fork 34 through a full stroke via the cam assembly 12. The one or more biasing members 28 may be configured to generate substantial force to assist in the alignment and engagement of a dog clutch 102 with a receiving gear 104. The biasing members 28 may be configured to have an expanded length that corresponds with the distance the shift fork must move to transition between the disengaged position 44 and the engaged position 46. The one or more biasing members 28 provide a persistent application force applied through the cam 14 during rotation onto the cam follower 24.

The cam assembly 12 includes a hub assembly 60. The hub assembly 60 may function to assist the actuator system 10 in moving the dog clutch 102 into the receiving gear 104 when a blockage condition is present. The hub assembly 60 may function to move the cam 14 between an expanded state 74 and a compressed 76, depending on the force exerted onto the follower portion 72 of the cam 14. The hub assembly 60 may include a hub housing 62 that extends through an aperture 66 of the cam 14, one or more biasing members 28 disposed within the cam aperture 66 against an interior surface 67 of the cam aperture 66 and in communication with the hub housing 62, and a retainer plate 64. The hub assembly 60 is connected with the gear set 18 so that the hub assembly 60 rotates when the motor 16 is actuated.

Figure 17A:
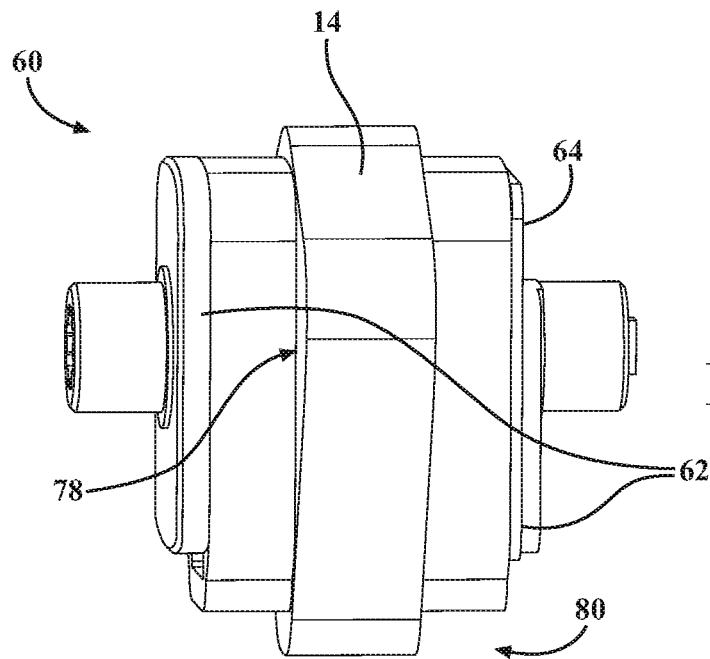
FIGS. 17A and 17B illustrate the hub assembly in a compressed state.
Figure 17B:
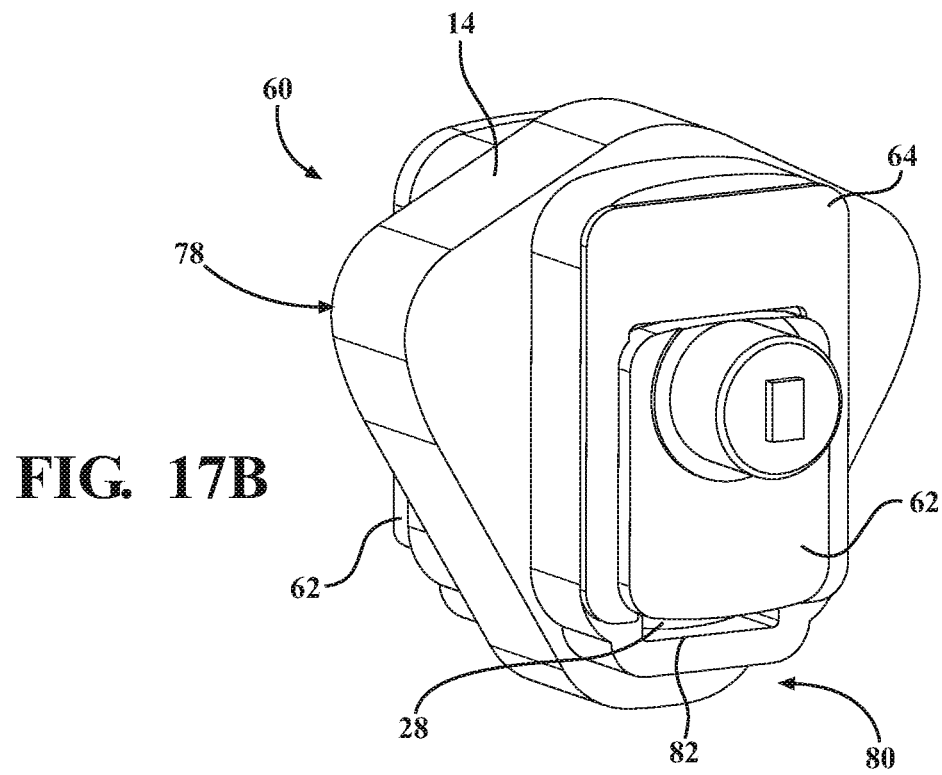
Figure 18:
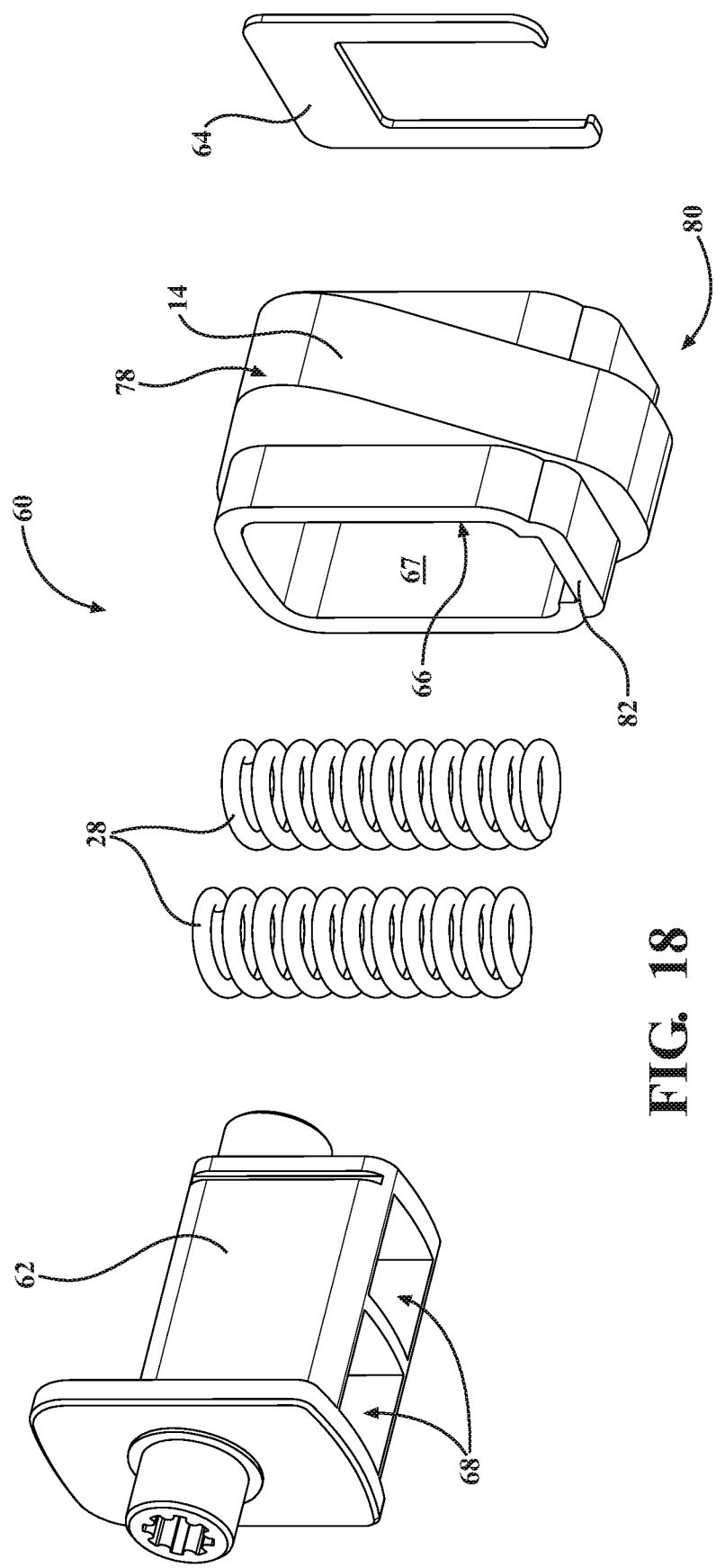
FIG. 18 is an exploded view of the hub assembly.

FIGS. 16A-16C and FIGS. 17A and 17B illustrate the hub assembly 60 including the cam 14. The hub housing 62 is connected to gear set 18. The hub housing 62 is configured to fit within the aperture 66 of the cam 14 and is keyed to the aperture 66 so that when the gear set 18 is turned, the hub housing 62 causes the cam 14 to turn. The hub housing 62 abuts the cam 14 along contact surfaces 84, 86, providing an axial stop for the cam 14 against the hub housing 62. Similarly, the retainer plate 64 is configured to hold the cam 14 and hub housing 62 in a desired axial relationship. As best seen in FIG. 14 and FIGS. 19-20, the hub housing 62 and an interior surface 67 of the aperture 66 are configured to receive the one or more biasing members 28. In one example, such as shown in FIGS. 16A-17B, the biasing members 28 are disposed within mounts 68 configured as channels to accept the biasing members 28. As can be seen in FIGS. 16A-17B, the hub housing 62 is disposed through the aperture 66 of the cam 14 and configured to allow the cam 14 to be displaced radially along the hub housing 62 when the rotational center of the cam 14 is moved radially away from the rotational axis RA, compressing the one or more biasing members 28 to move the shift fork 34 and cam assembly 12 from one of the plurality of intermediate positions 48 to an engaged position 46 (corresponding to the shifted position of the cam assembly 12). The hub assembly 60 is shown in the compressed state in FIGS. 17A and 17B, illustrating that the cam 14 has moved along the hub housing 62 compressing the biasing members 28. The one or more biasing members 28 are compressed between the mounts 68, 82 when a blockage condition is present as the cam 14 is rotated, such as seen in FIG. 21B.

The hub assembly 60 functions to assist the shift fork 34 transition between positions 44, 46, and 48, moving the cam 14 between a neutral position corresponding to the disengaged position 44, an intermediate position corresponding with the intermediate position 48, and a shifted position corresponding to the engaged position 46. When there is a dog clutch 102 misalignment causing a blockage condition, the hub assembly 60 applies a force F against the shift fork 34 compressing the one or more biasing members 28 between the follower portion 72 and the hub housing 62 (FIG. 21B). The compressed biasing members 28 apply a force that is great enough to quickly move the dog clutch 102 into position when the receiving gear 104 and dog clutch 102 are aligned.

Figure 22C:
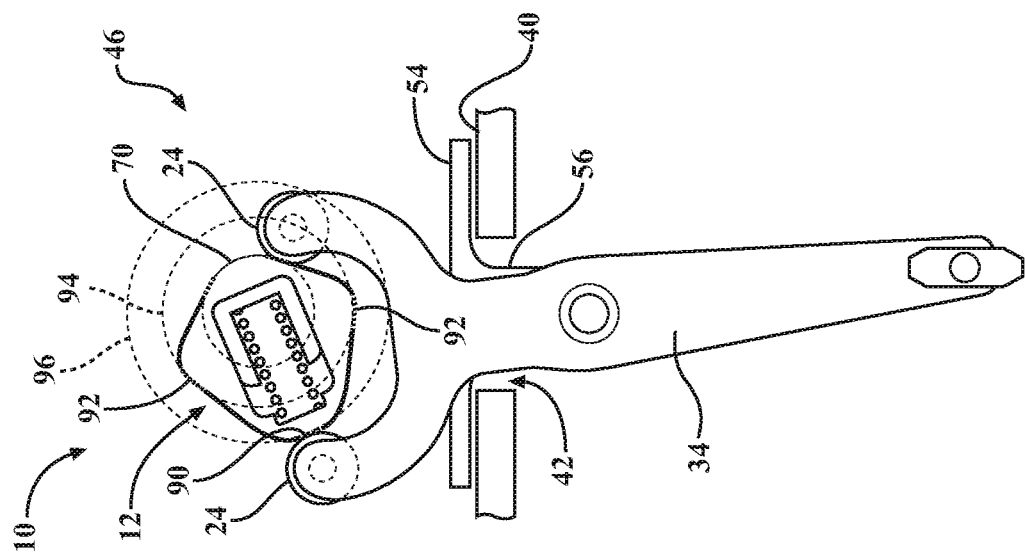
FIGS. 22A-22C illustrate schematic end views of the actuator assembly in a disengaged position, an intermediate position, and an engaged position, respectively.
Figure 22B:
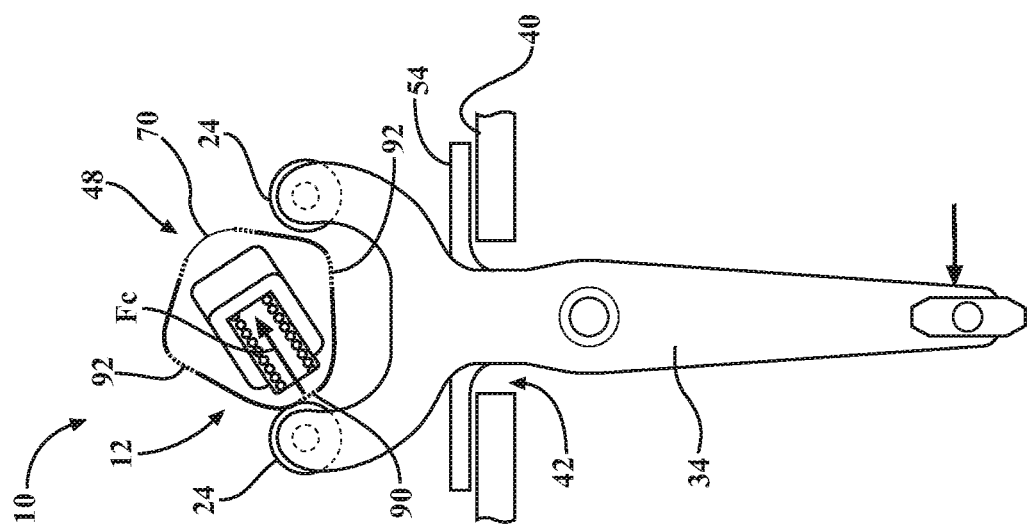
Figure 22A:
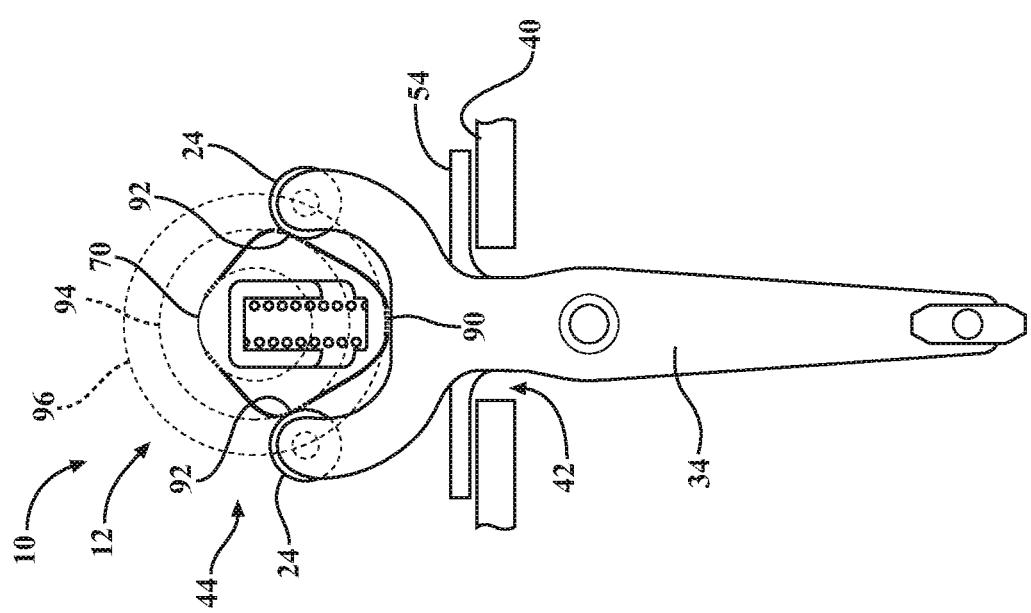

FIGS. 21A and 22A illustrate the actuation system 10 in a disengaged position 44. The actuator 10 is in the disengaged position 44 when the shifter fork 34 is in the disengaged position 44 (corresponding to the neutral position) and the cam assembly 12 is in the neutral position. From the disengaged position 44, the shift fork 34 may be moved to either side, depending on the rotational direction of the cam 14.

FIGS. 21B and 22B illustrate the actuator 10 in an intermediate position 48. The intermediate position 48 occurs when a blockage condition, such as when there is a misalignment between the dog clutch 102 and the receiving gear 104. During a blockage, a resistive force 52 is applied to the distal end of the shift fork 34 when the actuator is moving between the disengaged position 44 and the engaged position 46. The blockage is caused by a momentary misalignment of the dog clutch 102 with the receiving gear 104, so during this misalignment, the shift fork 34 is pressing against dog clutch 102 which is pressing against the receiving gear 104. In some examples, such as shown in FIGS. 21B and 22B, the base circle 70 and first section 78 of the cam 14 is free from contacting the cam followers 24 when the biasing members 28 are compressed in the intermediate position 48, moving the rotational center of the cam away from the rotational axis RA. The stored energy is applied from the follower portion of the cam 14 onto the shift fork 34. When the momentary misalignment/blockage is cleared, the stored energy released and translated into a movement force, pushing the shift fork 34 through the stroke into the desired position and moving the actuator 10 into the engaged position 46 and the cam assembly 12 into the shifted position (see FIG. 21C).

FIGS. 21C and 22C illustrate the actuator 10 in an engaged position 46. The actuator 10 is moved into the engaged position 46 when the cam follower 24 is actuated by the cam 14, the cam follower 24 applies a pressure to the top of the shift fork 34 through the actuator bracket 25, moving the proximal end of the shift fork 34 in the direction of the force which simultaneously moves the distal end of the shift fork 34 opposite the direction of the force relative to the pivot axis PA at the pivot coupler 30. The shift fork 34 is moved into the engaged position 46. Similarly, when the actuator 10 is moved from the engaged position 46 back to the disengaged position 44, the cam 14 actuates the cam follower 24 on the opposite of the engagement position, moving the actuator bracket 25 and shift fork 34 from the engaged position 46 to the disengaged position in the absence of a momentary blockage condition.

The actuator 10 may include one or more position sensors. In some examples, the actuator 10 may include a plurality of position sensors. The position sensor may be located on the cam 14, the hub housing 62, the actuator bracket 25, the shift fork 34, the motor 16, the housing 50, a combination thereof, or any location on the actuator 10. The position sensor may function to sense a blockage condition by monitoring the position of the cam 14, the actuation assembly 22, the one or more biasing members, the like, or a combination thereof. The sensor may function to sense or detect the position of the cam assembly 12, the hub assembly 60, the motor 16, the shift fork 34, the like, or a combination thereof. In one example, the actuation assembly 22 includes a sensor S which determines the position of the cam assembly 12 from the position of magnet M relative to the sensor.

The invention claimed is:
1. An actuator comprising:
a support including an outer surface and an inner surface, with the support having at least one pair of lugs extending from the outer surface of the support, each lug having an opening;
a drive system connected with the inner surface of the support;
a shift fork pivotally mounted to the pair of lugs with the shift fork operatively connected to the drive system and configured to move a distance defining a stroke length between a disengaged position and an engaged position;
an actuation assembly operatively connected with the drive system to move the shift fork between a neutral position, and a shifted position, with a plurality of intermediate positions between the neutral and shifted positions;

wherein the shift fork extends extending outward through the openings of the pair of lugs from the inner surface away from the outer surface.

2. The actuator of claim 1, wherein the shift fork includes a pair of arms.

3. The actuator of claim 2, wherein each arm of the pair of arms are each disposed within one of the pair of lugs, each arm having a pivot connection with a corresponding lug of the pair of lugs.

4. The actuator of claim 3, wherein each of the arms are pivotally connected with one of the pair of lugs, respectively.

5. The actuator of claim 1, wherein each of the pair of lugs includes a seal disposed around an outer surface abutting the outer surface of the support.

6. The actuator of claim 5, wherein the support includes a base and a cover, the base and the cover defining a cavity.

7. The actuator of claim 6, wherein the opening of each of the lugs is in communication with the cavity.

8. The actuator of claim 1, wherein the actuation assembly includes a cam assembly operatively connected with the drive system to move between a neutral position, and a shifted position, with a plurality of intermediate positions between the neutral and shifted positions, the shift fork being in the disengaged position when the cam assembly is in the neutral position.

9. The actuator of claim 8, wherein the cam assembly includes:
   a cam having an aperture defining an interior surface;
   a hub housing disposed within the aperture of the cam and connected to the drive system; and
   a biasing member disposed within the aperture and pre-loaded between an interior surface of the aperture of the cam and the hub housing.

10. A system comprising:
   a gearbox including a gear assembly, the gearbox having an outer surface with a pair of apertures; and
   an actuator comprising:
      a support including at least one pair of lugs with each lug having an opening;
      a drive system connected to the support;
      a shift fork including a pair of arms, the shift fork in communication with the drive system and configured to move a distance defining a stroke length between a disengaged position and an engaged position;
      an actuation assembly operatively connected with the drive system to move the shift fork between a neutral position, and a shifted position, with a plurality of intermediate positions between the neutral and shifted positions;
   wherein the actuator is mounted onto the outer surface of the gearbox with the pair of lugs extending into the pair of apertures of the gearbox, and at least a portion of the shift fork extending through the lugs and below the outer surface of the gearbox;
   wherein the portion of the shift fork within the gearbox engages the gear assembly within the gearbox.

11. The system of claim 10, wherein each lug is axially disposed around a portion of the shift fork.

12. The system of claim 10, wherein the shift fork is pivotally mounted to the pair of lugs.

13. The system of claim 10, wherein the pair of apertures of the gearbox are bosses extending from the outer surface of the gearbox.

14. The system of claim 10, wherein the lugs each having a shape to allow the shift fork to move between the neutral and shifted position.

15. The system of claim 14, wherein each arm of the pair of arms are each disposed within one of the pair of lugs, each arm having a pivot connection with a corresponding lug of the pair of lugs.

16. The system of claim 15, wherein the pivot connection is below the outer surface of the gearbox.

17. The system of claim 10, wherein each of the apertures are discrete and spaced apart from each other.

18. The system of claim 10, wherein each of the lugs are discrete and spaced apart from each other.

19. The system of claim 10, wherein each of the pair of lugs includes a seal surrounding a perimeter of each of the lugs.

20. The system of claim 19, wherein each seal mates with a corresponding seal surface on each of the pair apertures.

* * * * *